United States Patent
Ramanathan et al.

(10) Patent No.: US 11,082,344 B2
(45) Date of Patent: Aug. 3, 2021

(54) METHOD FOR UTILIZATION-BASED TRAFFIC THROTTLING IN A WIRELESS MESH NETWORK

(71) Applicant: goTenna, Inc., Brooklyn, NY (US)

(72) Inventors: Subramanian Ramanathan, Westford, MA (US); Christophe Servaes, Guttenberg, NJ (US)

(73) Assignee: goTenna, Inc., Brooklyn, NY (US)

( * ) Notice: Subject to any disclaimer, the term of this patent is extended or adjusted under 35 U.S.C. 154(b) by 0 days.

(21) Appl. No.: 16/813,343

(22) Filed: Mar. 9, 2020

(65) Prior Publication Data
US 2020/0287834 A1    Sep. 10, 2020

Related U.S. Application Data

(60) Provisional application No. 62/816,037, filed on Mar. 8, 2019.

(51) Int. Cl.
| | |
|---|---|
| *H04L 12/801* | (2013.01) |
| *H04L 29/06* | (2006.01) |
| *H04W 74/08* | (2009.01) |
| *H04L 12/723* | (2013.01) |
| *H04L 29/12* | (2006.01) |

(52) U.S. Cl.
CPC ............. *H04L 47/12* (2013.01); *H04L 45/50* (2013.01); *H04L 61/6022* (2013.01); *H04L 69/16* (2013.01); *H04W 74/0816* (2013.01)

(58) Field of Classification Search
None
See application file for complete search history.

(56) References Cited

U.S. PATENT DOCUMENTS

| | | |
|---|---|---|
| 4,496,886 A | 1/1985 | Gordon et al. |
| 5,412,654 A | 5/1995 | Perkins |
| 5,844,905 A | 12/1998 | McKay et al. |
| 6,304,556 B1 | 10/2001 | Haas |
| 6,584,080 B1 | 6/2003 | Ganz et al. |
| 6,625,135 B1 | 9/2003 | Johnson et al. |
| 6,628,620 B1 | 9/2003 | Cain |
| 6,674,721 B1 | 1/2004 | Dittia et al. |
| 6,714,517 B1 | 3/2004 | Fawaz et al. |
| 6,718,394 B2 | 4/2004 | Cain |

(Continued)

OTHER PUBLICATIONS

U.S. Appl. No. 10/063,331, filed Aug. 28, 2018, Daoura et al.

*Primary Examiner* — Anh Vu H Ly
(74) *Attorney, Agent, or Firm* — Hoffberg & Associates; Steven M. Hoffberg

(57) ABSTRACT

A system and method for managing congestion in a multi-hop wireless network, employing congestion notification messages. The technology has three main components: a mechanism at the Medium Access (MAC) layer for determining when a given source or transit node is deemed congested; a mechanism at the Network Layer (NL) determining how to propagate this information to applications, including suitably combining overload indications received from neighbors; and a mechanism at the Transport Layer (TL) of each source of traffic for determining when a source is generating excessive traffic, and combining it with Medium Access Control (MAC)-based overload indication from downstream nodes, thus providing a multi-layer approach to traffic throttling.

22 Claims, 3 Drawing Sheets

*Neighbor-overload is ON if a packet with overload flag ON was received within the previous OVERLOAD_STATUS_EXPIRY seconds, else it is OFF

(56) References Cited

U.S. PATENT DOCUMENTS

| | | |
|---|---|---|
| 6,728,211 B1 | 4/2004 | Peris et al. |
| 6,754,192 B2 | 6/2004 | Kennedy |
| 6,757,263 B1 | 6/2004 | Olds |
| 6,763,013 B2 | 7/2004 | Kennedy |
| 6,763,014 B2 | 7/2004 | Kennedy |
| 6,765,870 B2 | 7/2004 | Chintada et al. |
| 6,870,846 B2 | 3/2005 | Cain |
| 6,894,985 B2 | 5/2005 | Billhartz |
| 6,898,529 B2 | 5/2005 | Gao et al. |
| 6,906,741 B2 | 6/2005 | Canova, Jr. et al. |
| 6,937,602 B2 | 8/2005 | Whitehill et al. |
| 6,954,435 B2 | 10/2005 | Billhartz et al. |
| 6,961,310 B2 | 11/2005 | Cain |
| 6,975,614 B2 | 12/2005 | Kennedy |
| 6,977,608 B1 | 12/2005 | Anderson et al. |
| 6,982,982 B1 | 1/2006 | Barker, Jr. et al. |
| 6,986,161 B2 | 1/2006 | Billhartz |
| 6,999,441 B2 | 2/2006 | Flammer, III et al. |
| 7,007,102 B2 | 2/2006 | Billhartz et al. |
| 7,027,409 B2 | 4/2006 | Cain |
| 7,027,426 B2 | 4/2006 | Billhartz |
| 7,028,687 B1 | 4/2006 | Silver et al. |
| 7,068,600 B2 | 6/2006 | Cain |
| 7,068,605 B2 | 6/2006 | Cain et al. |
| 7,072,618 B1 | 7/2006 | Strutt |
| 7,075,919 B1 | 7/2006 | Wendt et al. |
| 7,079,552 B2 | 7/2006 | Cain et al. |
| 7,082,117 B2 | 7/2006 | Billhartz |
| 7,085,290 B2 | 8/2006 | Cain et al. |
| 7,096,037 B2 | 8/2006 | Canova, Jr. et al. |
| 7,142,866 B2 | 11/2006 | Windham et al. |
| 7,164,667 B2 | 1/2007 | Rayment et al. |
| 7,170,425 B2 | 1/2007 | Christopher et al. |
| 7,176,807 B2 | 2/2007 | Scoggins et al. |
| 7,184,421 B1 | 2/2007 | Liu et al. |
| 7,216,282 B2 | 5/2007 | Cain |
| 7,251,238 B2 | 7/2007 | Joshi et al. |
| 7,266,085 B2 | 9/2007 | Stine |
| 7,281,057 B2 | 10/2007 | Cain |
| 7,299,038 B2 | 11/2007 | Kennedy et al. |
| 7,299,042 B2 | 11/2007 | Moore et al. |
| 7,308,369 B2 | 12/2007 | Rudran et al. |
| 7,308,370 B2 | 12/2007 | Mason, Jr. et al. |
| 7,317,898 B2 | 1/2008 | Tegreene |
| 7,327,998 B2 | 2/2008 | Kumar et al. |
| 7,330,694 B2 | 2/2008 | Lee et al. |
| 7,346,167 B2 | 3/2008 | Billhartz et al. |
| 7,348,895 B2 | 3/2008 | Lagassey |
| 7,356,001 B1 | 4/2008 | Jones et al. |
| 7,362,711 B2 | 4/2008 | Golle et al. |
| 7,366,111 B2 | 4/2008 | Thubert et al. |
| 7,366,544 B2 | 4/2008 | Tegreene |
| 7,382,765 B2 | 6/2008 | Kennedy et al. |
| 7,389,295 B2 | 6/2008 | Jung et al. |
| 7,394,798 B2 | 7/2008 | Naghian |
| 7,394,826 B2 | 7/2008 | Cain et al. |
| 7,403,496 B2 | 7/2008 | Bonta |
| 7,418,238 B2 | 8/2008 | Tegreene |
| 7,420,944 B2 | 9/2008 | Norris et al. |
| 7,427,927 B2 | 9/2008 | Borleske et al. |
| 7,428,221 B2 | 9/2008 | Thubert et al. |
| 7,450,517 B2 | 11/2008 | Cho |
| 7,453,864 B2 | 11/2008 | Kennedy et al. |
| 7,457,834 B2 | 11/2008 | Jung et al. |
| 7,468,954 B2 | 12/2008 | Sherman |
| 7,480,248 B2 | 1/2009 | Duggi et al. |
| 7,489,635 B2 | 2/2009 | Evans et al. |
| 7,495,578 B2 | 2/2009 | Borleske |
| 7,529,561 B2 | 5/2009 | Heinonen et al. |
| 7,535,883 B2 | 5/2009 | Kim et al. |
| 7,536,388 B2 | 5/2009 | Jung et al. |
| 7,539,759 B2 | 5/2009 | Narayanan et al. |
| 7,545,285 B2 | 6/2009 | Shuey et al. |
| 7,561,514 B2 | 7/2009 | Elmasry et al. |
| 7,567,547 B2 | 7/2009 | Mosko et al. |
| 7,567,577 B2 | 7/2009 | Thubert et al. |
| 7,580,730 B2 | 8/2009 | Tegreene |
| 7,580,782 B2 | 8/2009 | Breed et al. |
| 7,581,095 B2 | 8/2009 | Billhartz |
| 7,587,001 B2 | 9/2009 | Hazani et al. |
| 7,590,589 B2 | 9/2009 | Hoffberg |
| 7,599,696 B2 | 10/2009 | Jung et al. |
| 7,602,738 B2 | 10/2009 | Preguica |
| 7,616,961 B2 | 11/2009 | Billhartz |
| 7,626,967 B2 | 12/2009 | Yarvis et al. |
| 7,656,851 B1 | 2/2010 | Ghanadan et al. |
| 7,657,354 B2 | 2/2010 | Breed et al. |
| 7,660,318 B2 | 2/2010 | Rahman et al. |
| 7,660,950 B2 | 2/2010 | Miller et al. |
| 7,678,068 B2 | 3/2010 | Levine et al. |
| 7,693,051 B2 | 4/2010 | Ozer et al. |
| 7,693,105 B2 | 4/2010 | Rayment et al. |
| 7,693,484 B2 | 4/2010 | Ting et al. |
| 7,695,446 B2 | 4/2010 | Levine et al. |
| 7,697,454 B2 | 4/2010 | Smith |
| 7,697,459 B2 | 4/2010 | Conner et al. |
| 7,702,594 B2 | 4/2010 | Scoggins et al. |
| 7,706,282 B2 | 4/2010 | Huang |
| 7,706,842 B2 | 4/2010 | Tegreene |
| 7,710,870 B2 | 5/2010 | Lee et al. |
| 7,710,932 B2 | 5/2010 | Muthuswamy et al. |
| 7,719,988 B1 | 5/2010 | Ruiz et al. |
| 7,725,080 B2 | 5/2010 | Tegreene |
| 7,729,336 B2 | 6/2010 | Pun et al. |
| 7,738,372 B2 | 6/2010 | Elmasry et al. |
| 7,742,399 B2 | 6/2010 | Pun |
| 7,742,430 B2 | 6/2010 | Scoggins et al. |
| 7,746,794 B2 | 6/2010 | Sink |
| 7,753,795 B2 | 7/2010 | Harris et al. |
| 7,764,617 B2 | 7/2010 | Cain et al. |
| 7,773,559 B2 | 8/2010 | Chen et al. |
| 7,778,235 B2 | 8/2010 | Thubert et al. |
| 7,787,366 B2 | 8/2010 | Cuffaro et al. |
| 7,788,387 B2 | 8/2010 | Kumar et al. |
| 7,792,050 B2 | 9/2010 | Metke et al. |
| 7,792,059 B2 | 9/2010 | Fonseca, Jr. et al. |
| 7,808,985 B2 | 10/2010 | Romero et al. |
| 7,813,451 B2 | 10/2010 | Binder et al. |
| 7,814,322 B2 | 10/2010 | Gurevich et al. |
| 7,817,623 B2 | 10/2010 | Dawson et al. |
| 7,830,820 B2 | 11/2010 | Duke et al. |
| 7,835,273 B2 | 11/2010 | Sin |
| 7,843,817 B2 | 11/2010 | Gong et al. |
| 7,843,861 B2 | 11/2010 | Dawson et al. |
| 7,849,139 B2 | 12/2010 | Wolfson et al. |
| 7,852,764 B2 | 12/2010 | Yamaguchi et al. |
| 7,852,826 B2 | 12/2010 | Kitchin |
| 7,860,025 B2 | 12/2010 | Thubert et al. |
| 7,860,081 B2 | 12/2010 | Dawson et al. |
| 7,860,968 B2 | 12/2010 | Bornhoevd et al. |
| 7,873,019 B2 | 1/2011 | Dawson et al. |
| 7,881,474 B2 | 2/2011 | Sun |
| 7,886,075 B2 | 2/2011 | Molteni et al. |
| 7,890,112 B2 | 2/2011 | Ito et al. |
| 7,894,828 B2 | 2/2011 | Dawson et al. |
| 7,898,993 B2 | 3/2011 | Dawson et al. |
| 7,902,973 B2 | 3/2011 | Thubert et al. |
| 7,905,640 B2 | 3/2011 | Gergets et al. |
| 7,911,962 B2 | 3/2011 | Khuu et al. |
| 7,912,003 B2 | 3/2011 | Radunovic et al. |
| 7,912,645 B2 | 3/2011 | Breed et al. |
| 7,924,796 B2 | 4/2011 | Vu Duong et al. |
| 7,929,914 B2 | 4/2011 | Tegreene |
| 7,936,732 B2 | 5/2011 | Ho et al. |
| 7,941,188 B2 | 5/2011 | Jung et al. |
| 7,944,878 B2 | 5/2011 | Dawson et al. |
| 7,957,355 B1 | 6/2011 | Heiferling et al. |
| 7,961,650 B2 | 6/2011 | Davies |
| 7,962,101 B2 | 6/2011 | Vaswani et al. |
| 7,962,154 B2 | 6/2011 | Nakakita et al. |
| 7,969,914 B1 | 6/2011 | Gerber et al. |
| 7,970,418 B2 | 6/2011 | Schmidt et al. |
| 7,974,402 B2 | 7/2011 | Pun |
| 7,978,062 B2 | 7/2011 | LaLonde et al. |

(56) References Cited

U.S. PATENT DOCUMENTS

| | | |
|---|---|---|
| 7,979,311 B2 | 7/2011 | Dawson et al. |
| 7,983,835 B2 | 7/2011 | Lagassey |
| 7,990,947 B2 | 8/2011 | Twitchell, Jr. et al. |
| 7,996,558 B2 | 8/2011 | Hsu et al. |
| 8,009,562 B2 | 8/2011 | Rayment et al. |
| 8,009,615 B2 | 8/2011 | Krishnakumar et al. |
| 8,014,329 B2 | 9/2011 | Gong |
| 8,031,720 B2 | 10/2011 | Yagyu et al. |
| 8,035,479 B2 | 10/2011 | Tran |
| 8,040,863 B2 | 10/2011 | Dawson et al. |
| 8,041,377 B2 | 10/2011 | Itaya et al. |
| 8,042,048 B2 | 10/2011 | Wilson et al. |
| 8,050,196 B2 | 11/2011 | Yoon |
| 8,059,578 B2 | 11/2011 | Rudnick |
| 8,059,620 B2 | 11/2011 | Moon |
| 8,060,017 B2 | 11/2011 | Schlicht et al. |
| 8,060,308 B2 | 11/2011 | Breed |
| 8,065,166 B2 | 11/2011 | Maresh et al. |
| 8,065,411 B2 | 11/2011 | Spiess et al. |
| 8,072,906 B2 | 12/2011 | Naghian |
| 8,073,384 B2 | 12/2011 | Shuey et al. |
| 8,089,884 B2 | 1/2012 | Liu |
| 8,090,596 B2 | 1/2012 | Maresh et al. |
| 8,099,108 B2 | 1/2012 | Camp, Jr. et al. |
| 8,099,307 B2 | 1/2012 | Maresh et al. |
| 8,108,228 B2 | 1/2012 | Maresh et al. |
| 8,108,429 B2 | 1/2012 | Sim-Tang et al. |
| 8,115,617 B2 | 2/2012 | Thubert et al. |
| 8,121,628 B2 | 2/2012 | Mauti, Jr. |
| 8,121,629 B2 | 2/2012 | Davis et al. |
| 8,121,870 B2 | 2/2012 | Maresh et al. |
| 8,130,708 B2 | 3/2012 | Singh |
| 8,131,569 B2 | 3/2012 | Maresh et al. |
| 8,131,838 B2 | 3/2012 | Bornhoevd et al. |
| 8,134,950 B2 | 3/2012 | Pun |
| 8,135,362 B2 | 3/2012 | LaDue |
| 8,138,934 B2 | 3/2012 | Veillette et al. |
| 8,139,504 B2 | 3/2012 | Mankins et al. |
| 8,144,596 B2 | 3/2012 | Veillette |
| 8,144,619 B2 | 3/2012 | Hoffberg |
| 8,151,140 B2 | 4/2012 | Sim-Tang |
| 8,161,097 B2 | 4/2012 | Jung et al. |
| 8,170,577 B2 | 5/2012 | Singh |
| 8,170,957 B2 | 5/2012 | Richard |
| 8,171,364 B2 | 5/2012 | Veillette |
| 8,174,381 B2 | 5/2012 | Imes et al. |
| 8,180,294 B2 | 5/2012 | Ting et al. |
| 8,184,681 B2 | 5/2012 | Binder et al. |
| 8,194,541 B2 | 6/2012 | Leppanen et al. |
| 8,195,483 B2 | 6/2012 | Maresh et al. |
| 8,195,628 B2 | 6/2012 | Sim-Tang |
| 8,200,246 B2 | 6/2012 | Khosravy et al. |
| 8,203,463 B2 | 6/2012 | Bragg et al. |
| 8,203,990 B2 | 6/2012 | Watanabe et al. |
| 8,213,409 B2 | 7/2012 | Rudnick et al. |
| 8,213,895 B2 | 7/2012 | Hurwitz et al. |
| 8,223,710 B2 | 7/2012 | Ito |
| 8,233,389 B2 | 7/2012 | Yim et al. |
| 8,238,319 B2 | 8/2012 | Kadowaki et al. |
| 8,239,169 B2 | 8/2012 | Gregory et al. |
| 8,249,984 B2 | 8/2012 | Dawson et al. |
| 8,255,469 B2 | 8/2012 | Leppanen et al. |
| 8,256,681 B2 | 9/2012 | Wang |
| 8,266,657 B2 | 9/2012 | Margulis |
| 8,271,449 B2 | 9/2012 | Jung et al. |
| 8,275,824 B2 | 9/2012 | Jung et al. |
| 8,289,182 B2 | 10/2012 | Vogel et al. |
| 8,289,186 B2 | 10/2012 | Osafune |
| 8,300,615 B2 | 10/2012 | Copeland et al. |
| 8,311,533 B1 | 11/2012 | Alcorn |
| 8,315,231 B2 | 11/2012 | Pirzada et al. |
| 8,319,658 B2 | 11/2012 | Conant et al. |
| 8,319,833 B2 | 11/2012 | Weinstein et al. |
| 8,320,302 B2 | 11/2012 | Richeson et al. |
| 8,320,414 B2 | 11/2012 | Dawson et al. |
| 8,323,189 B2 | 12/2012 | Tran et al. |
| 8,325,612 B1 | 12/2012 | Ruiz et al. |
| 8,330,649 B2 | 12/2012 | Menouar et al. |
| 8,331,396 B2 | 12/2012 | Hiertz et al. |
| 8,332,055 B2 | 12/2012 | Veillette |
| 8,334,787 B2 | 12/2012 | Bushman et al. |
| 8,335,164 B2 | 12/2012 | Liu |
| 8,335,207 B2 | 12/2012 | Singh et al. |
| 8,335,814 B2 | 12/2012 | Jung et al. |
| 8,341,279 B2 | 12/2012 | Thubert et al. |
| 8,341,289 B2 | 12/2012 | Hellhake et al. |
| 8,345,098 B2 | 1/2013 | Grigsby et al. |
| 8,346,846 B2 | 1/2013 | Jung et al. |
| 8,352,420 B2 | 1/2013 | Jung et al. |
| 8,359,643 B2 | 1/2013 | Low et al. |
| 8,363,662 B2 | 1/2013 | Thubert et al. |
| 8,364,648 B1 | 1/2013 | Sim-Tang |
| 8,369,880 B2 | 2/2013 | Citrano, III et al. |
| 8,370,697 B2 | 2/2013 | Veillette |
| 8,373,556 B2 | 2/2013 | LaLonde et al. |
| 8,373,588 B2 | 2/2013 | Kuhn |
| 8,374,165 B2 | 2/2013 | Yang |
| 8,374,352 B2 | 2/2013 | Song et al. |
| 8,385,550 B2 | 2/2013 | Sun |
| 8,386,278 B2 | 2/2013 | Maresh et al. |
| 8,392,541 B2 | 3/2013 | Agarwal et al. |
| 8,392,607 B2 | 3/2013 | Ishii et al. |
| 8,395,498 B2 | 3/2013 | Gaskill et al. |
| 8,396,602 B2 | 3/2013 | Imes et al. |
| 8,400,507 B2 | 3/2013 | Grigsby et al. |
| 8,401,564 B2 | 3/2013 | Singh |
| 8,406,153 B2 | 3/2013 | Vasseur et al. |
| 8,406,239 B2 | 3/2013 | Hurwitz et al. |
| 8,406,252 B1 | 3/2013 | Wuthnow et al. |
| 8,427,957 B2 | 4/2013 | Matsushita et al. |
| 8,428,517 B2 | 4/2013 | Ting et al. |
| 8,432,820 B2 | 4/2013 | Liu et al. |
| 8,441,958 B2 | 5/2013 | Thubert et al. |
| 8,441,994 B2 | 5/2013 | Ito |
| 8,442,520 B2 | 5/2013 | Alcorn |
| 8,447,419 B1 | 5/2013 | de Anda Fast |
| 8,447,849 B2 | 5/2013 | Shaffer et al. |
| 8,451,744 B2 | 5/2013 | Vasseur |
| 8,452,895 B2 | 5/2013 | Ito |
| 8,462,691 B2 | 6/2013 | Tateson |
| 8,463,238 B2 | 6/2013 | Forstall et al. |
| 8,467,991 B2 | 6/2013 | Khosravy et al. |
| 8,472,348 B2 | 6/2013 | Hui et al. |
| 8,473,989 B2 | 6/2013 | Bahl et al. |
| 8,475,368 B2 | 7/2013 | Tran et al. |
| 8,483,066 B2 | 7/2013 | Rayment et al. |
| 8,483,192 B2 | 7/2013 | Chu et al. |
| 8,488,589 B2 | 7/2013 | Rudnick et al. |
| 8,489,765 B2 | 7/2013 | Vasseur et al. |
| 8,494,458 B2 | 7/2013 | Tucker et al. |
| 8,495,244 B2 | 7/2013 | Bonar et al. |
| 8,496,181 B2 | 7/2013 | Wang |
| 8,502,148 B2 | 8/2013 | Wagner et al. |
| 8,502,640 B2 | 8/2013 | Veillette |
| 8,503,309 B2 | 8/2013 | Vasseur et al. |
| 8,504,921 B2 | 8/2013 | Wilson et al. |
| 8,509,762 B2 | 8/2013 | Li et al. |
| 8,509,765 B2 | 8/2013 | Alcorn |
| 8,514,915 B2 | 8/2013 | Binder et al. |
| 8,515,547 B2 | 8/2013 | Mass et al. |
| 8,520,535 B2 | 8/2013 | Dawson et al. |
| 8,520,578 B2 | 8/2013 | Rayment et al. |
| 8,520,676 B2 | 8/2013 | Shaffer et al. |
| 8,521,156 B2 | 8/2013 | Alcorn |
| 8,525,692 B2 | 9/2013 | Mason, Jr. et al. |
| 8,527,622 B2 | 9/2013 | Moreira Sa de Souza |
| 8,533,758 B2 | 9/2013 | Ruiz-Velasco |
| 8,538,458 B2 | 9/2013 | Haney |
| 8,544,023 B2 | 9/2013 | Sim-Tang et al. |
| 8,547,875 B2 | 10/2013 | Adams et al. |
| 8,548,607 B1 | 10/2013 | Belz et al. |
| 8,553,688 B2 | 10/2013 | Vasseur et al. |
| 8,559,442 B2 | 10/2013 | Vasseur et al. |
| 8,560,274 B2 | 10/2013 | Gregory et al. |

(56) References Cited

U.S. PATENT DOCUMENTS

| | | |
|---|---|---|
| 8,571,046 B2 | 10/2013 | Romero et al. |
| 8,571,518 B2 | 10/2013 | Imes et al. |
| 8,576,831 B2 | 11/2013 | Zhang et al. |
| 8,577,391 B2 | 11/2013 | Parker et al. |
| 8,578,015 B2 | 11/2013 | Billhartz |
| 8,578,054 B2 | 11/2013 | Thubert et al. |
| 8,583,671 B2 | 11/2013 | Martin et al. |
| 8,583,978 B2 | 11/2013 | Shaffer et al. |
| 8,587,427 B2 | 11/2013 | LaLonde et al. |
| 8,588,108 B2 | 11/2013 | Vasseur et al. |
| 8,593,419 B2 | 11/2013 | Thorn |
| 8,593,986 B2 | 11/2013 | Vasseur et al. |
| 8,595,359 B2 | 11/2013 | Shaffer et al. |
| 8,600,830 B2 | 12/2013 | Hoffberg |
| 8,605,591 B2 | 12/2013 | Shaffer et al. |
| 8,612,583 B2 | 12/2013 | Hui et al. |
| 8,615,257 B2 | 12/2013 | Khosravy et al. |
| 8,619,576 B2 | 12/2013 | Vasseur et al. |
| 8,619,789 B2 | 12/2013 | Hui et al. |
| 8,620,772 B2 | 12/2013 | Owen |
| 8,620,784 B2 | 12/2013 | Dawson et al. |
| 8,621,577 B2 | 12/2013 | Choi et al. |
| 8,622,837 B2 | 1/2014 | Harris et al. |
| 8,624,771 B2 | 1/2014 | Kuhn |
| 8,625,515 B2 | 1/2014 | Liu et al. |
| 8,626,344 B2 | 1/2014 | Imes et al. |
| 8,630,177 B2 | 1/2014 | Vasseur et al. |
| 8,630,291 B2 | 1/2014 | Shaffer et al. |
| 8,630,314 B2 | 1/2014 | York |
| 8,631,101 B2 | 1/2014 | Shaffer et al. |
| 8,636,395 B2 | 1/2014 | Gergets et al. |
| 8,638,667 B2 | 1/2014 | Shaffer et al. |
| 8,638,763 B2 | 1/2014 | Comstock et al. |
| 8,652,038 B2 | 2/2014 | Tran et al. |
| 8,654,627 B2 | 2/2014 | Datz et al. |
| 8,654,649 B2 | 2/2014 | Vasseur et al. |
| 8,654,698 B2 | 2/2014 | Koskela et al. |
| 8,654,782 B2 | 2/2014 | Meil et al. |
| 8,655,369 B2 | 2/2014 | Chen |
| 8,655,395 B2 | 2/2014 | Gaal et al. |
| 8,660,047 B2 | 2/2014 | Jerbi et al. |
| 8,660,139 B2 | 2/2014 | Ruckart |
| 8,661,081 B2 | 2/2014 | Rahnama et al. |
| 8,661,144 B2 | 2/2014 | Schultz et al. |
| 8,661,500 B2 | 2/2014 | Boldyrev et al. |
| 8,665,890 B2 | 3/2014 | Yousefi'zadeh et al. |
| 8,667,084 B2 | 3/2014 | Vasseur et al. |
| 8,670,416 B2 | 3/2014 | Ree et al. |
| 8,675,678 B2 | 3/2014 | Farrag et al. |
| 8,681,620 B2 | 3/2014 | Park et al. |
| 8,682,982 B2 | 3/2014 | Jung et al. |
| 8,693,322 B2 | 4/2014 | Zhang |
| 8,699,333 B2 | 4/2014 | Vasseur et al. |
| 8,699,368 B2 | 4/2014 | Hui et al. |
| 8,699,377 B2 | 4/2014 | Veillette |
| 8,700,301 B2 | 4/2014 | Khosravy et al. |
| 8,700,302 B2 | 4/2014 | Khosravy et al. |
| 8,700,536 B2 | 4/2014 | Richard |
| 8,707,785 B2 | 4/2014 | Goodman et al. |
| 8,712,711 B2 | 4/2014 | Nayar et al. |
| 8,715,072 B2 | 5/2014 | Harris et al. |
| 8,718,055 B2 | 5/2014 | Vasseur et al. |
| 8,719,563 B2 | 5/2014 | Kojima et al. |
| 8,725,274 B2 | 5/2014 | Veillette |
| 8,727,978 B2 | 5/2014 | Tran et al. |
| 8,730,047 B2 | 5/2014 | Ridder et al. |
| 8,730,875 B2 | 5/2014 | Noda |
| 8,732,454 B2 | 5/2014 | Furukawa et al. |
| 8,738,944 B2 | 5/2014 | Addepalli et al. |
| 8,743,750 B2 | 6/2014 | Tourolle et al. |
| 8,743,768 B2 | 6/2014 | Vasseur et al. |
| 8,743,866 B2 | 6/2014 | Vasseur |
| 8,747,313 B2 | 6/2014 | Tran et al. |
| 8,751,063 B2 | 6/2014 | Bernstein et al. |
| 8,751,644 B2 | 6/2014 | Bornhoevd et al. |
| 8,755,763 B2 | 6/2014 | Qureshey et al. |
| 8,756,449 B2 | 6/2014 | Shaffer et al. |
| 8,760,339 B2 | 6/2014 | Kuhn |
| 8,761,175 B2 | 6/2014 | Guha et al. |
| 8,761,285 B2 | 6/2014 | Addepalli et al. |
| 8,762,852 B2 | 6/2014 | Davis et al. |
| 8,769,442 B2 | 7/2014 | Khosravy et al. |
| 8,774,050 B2 | 7/2014 | Vasseur et al. |
| 8,774,946 B2 | 7/2014 | Nrusimhan et al. |
| 8,780,201 B1 | 7/2014 | Scalisi et al. |
| 8,780,953 B2 | 7/2014 | Shaffer et al. |
| 8,781,462 B2 | 7/2014 | Osterloh et al. |
| 8,787,392 B2 | 7/2014 | Vasseur et al. |
| 8,787,944 B2 | 7/2014 | Smith |
| 8,788,516 B1 | 7/2014 | Jakubik |
| 8,792,850 B2 | 7/2014 | Qureshey et al. |
| 8,792,880 B2 | 7/2014 | Alcorn |
| 8,797,878 B1 | 8/2014 | Ruiz et al. |
| 8,798,094 B2 | 8/2014 | Wuthnow et al. |
| 8,799,220 B2 | 8/2014 | O'Malley |
| 8,799,510 B2 | 8/2014 | Vasseur et al. |
| 8,800,010 B2 | 8/2014 | Hui et al. |
| 8,804,603 B2 | 8/2014 | Powell, III et al. |
| 8,806,633 B2 | 8/2014 | Shaffer et al. |
| 8,812,419 B1 | 8/2014 | Teller et al. |
| 8,817,665 B2 | 8/2014 | Thubert et al. |
| 8,817,709 B2 | 8/2014 | Wu et al. |
| 8,818,522 B2 | 8/2014 | Mass et al. |
| 8,819,172 B2 | 8/2014 | Davis et al. |
| 8,819,191 B2 | 8/2014 | Hui et al. |
| 8,823,795 B1 | 9/2014 | Scalisi et al. |
| 8,824,471 B2 | 9/2014 | Hui et al. |
| 8,830,837 B2 | 9/2014 | Vasseur et al. |
| 8,831,279 B2 | 9/2014 | Rodriguez et al. |
| 8,831,869 B2 | 9/2014 | Bai et al. |
| 8,832,428 B2 | 9/2014 | Ota et al. |
| 8,837,277 B2 | 9/2014 | Vasseur et al. |
| 8,842,180 B1 | 9/2014 | Kasmir et al. |
| 8,842,630 B2 | 9/2014 | Shaffer et al. |
| 8,843,156 B2 | 9/2014 | Prince et al. |
| 8,848,970 B2 | 9/2014 | Aller et al. |
| 8,855,794 B2 | 10/2014 | Imes et al. |
| 8,855,830 B2 | 10/2014 | Imes et al. |
| 8,856,323 B2 | 10/2014 | Enns et al. |
| 8,861,390 B2 | 10/2014 | Hui et al. |
| 8,861,620 B2 | 10/2014 | Toosi et al. |
| 8,862,774 B2 | 10/2014 | Vasseur et al. |
| 8,867,329 B2 | 10/2014 | Hui et al. |
| 8,868,374 B2 | 10/2014 | Khosravy et al. |
| 8,872,379 B2 | 10/2014 | Ruiz et al. |
| 8,872,767 B2 | 10/2014 | Khosravy et al. |
| 8,872,915 B1 | 10/2014 | Scalisi et al. |
| 8,873,391 B2 | 10/2014 | Brown et al. |
| 8,873,526 B2 | 10/2014 | Shaffer et al. |
| 8,874,477 B2 | 10/2014 | Hoffberg |
| 8,874,788 B2 | 10/2014 | Vasseur et al. |
| 8,879,604 B2 | 11/2014 | Woo et al. |
| 8,879,613 B1 | 11/2014 | Hui et al. |
| 8,880,060 B2 | 11/2014 | Alcorn |
| 8,885,501 B2 | 11/2014 | Vasseur et al. |
| 8,885,630 B2 | 11/2014 | Pun et al. |
| 8,886,227 B2 | 11/2014 | Schmidt et al. |
| 8,891,534 B2 | 11/2014 | Vasseur et al. |
| 8,891,588 B1 | 11/2014 | Hui et al. |
| 8,892,271 B2 | 11/2014 | Breed |
| 8,908,516 B2 | 12/2014 | Tzamaloukas et al. |
| 8,908,536 B2 | 12/2014 | Hui et al. |
| 8,908,621 B2 | 12/2014 | Vasseur et al. |
| 8,908,626 B2 | 12/2014 | Hui et al. |
| 8,918,480 B2 | 12/2014 | Qureshey et al. |
| 8,923,186 B1 | 12/2014 | daCosta |
| 8,923,422 B2 | 12/2014 | Hui et al. |
| 8,923,910 B2 | 12/2014 | Wu et al. |
| 8,930,361 B2 | 1/2015 | Heinonen et al. |
| 8,934,366 B2 | 1/2015 | Hui et al. |
| 8,934,496 B2 | 1/2015 | Vasseur |
| 8,937,886 B2 | 1/2015 | Shaffer et al. |
| 8,938,270 B2 | 1/2015 | Singh |
| 8,942,301 B2 | 1/2015 | Hui et al. |

(56) References Cited

U.S. PATENT DOCUMENTS

| | | |
|---|---|---|
| 8,948,046 B2 | 2/2015 | Kang et al. |
| 8,948,229 B2 | 2/2015 | Hui et al. |
| 8,949,959 B2 | 2/2015 | Mahamuni et al. |
| 8,954,582 B2 | 2/2015 | Vasseur et al. |
| 8,958,339 B2 | 2/2015 | Le et al. |
| 8,959,539 B2 | 2/2015 | Adimatyam et al. |
| 8,964,762 B2 | 2/2015 | Hui et al. |
| 8,964,787 B2 | 2/2015 | McMullin et al. |
| 8,965,288 B2 | 2/2015 | Barnes et al. |
| 8,970,392 B2 | 3/2015 | LaLonde et al. |
| 8,970,394 B2 | 3/2015 | Veillette |
| 8,971,188 B2 | 3/2015 | Vasseur et al. |
| 8,972,159 B2 | 3/2015 | Ferreira et al. |
| 8,976,007 B2 | 3/2015 | Dugan et al. |
| 8,982,708 B1 | 3/2015 | McCabe et al. |
| 9,185,598 B2 | 11/2015 | Wu et al. |
| 9,215,620 B2 | 12/2015 | Kruys et al. |
| 9,319,922 B2 | 4/2016 | Acker et al. |
| 9,407,552 B2 | 8/2016 | Fujita et al. |
| 9,503,891 B2 | 11/2016 | Yun et al. |
| 9,503,926 B2 | 11/2016 | Kruys et al. |
| 9,559,963 B2 | 1/2017 | Mikoda et al. |
| 9,655,006 B2 | 5/2017 | Zhu et al. |
| 9,774,410 B2 | 9/2017 | Daoura et al. |
| 9,847,887 B2 | 12/2017 | Acker et al. |
| 9,900,119 B2 | 2/2018 | Daoura et al. |
| 2001/0036157 A1 | 11/2001 | Blanc et al. |
| 2002/0039357 A1 | 4/2002 | Lipasti et al. |
| 2002/0071160 A1 | 6/2002 | Pavelchek |
| 2002/0083316 A1 | 6/2002 | Platenberg et al. |
| 2002/0136163 A1 | 9/2002 | Kawakami et al. |
| 2002/0163933 A1 | 11/2002 | Benveniste |
| 2002/0191573 A1 | 12/2002 | Whitehill et al. |
| 2003/0002442 A1 | 1/2003 | Flammer, III et al. |
| 2003/0028585 A1 | 2/2003 | Yeager et al. |
| 2003/0033394 A1 | 2/2003 | Stine |
| 2003/0041141 A1 | 2/2003 | Abdelaziz et al. |
| 2003/0055894 A1 | 3/2003 | Yeager et al. |
| 2003/0070070 A1 | 4/2003 | Yeager et al. |
| 2003/0076837 A1 | 4/2003 | Whitehill et al. |
| 2003/0128687 A1 | 7/2003 | Worfolk et al. |
| 2003/0174682 A1 | 9/2003 | Barker |
| 2003/0202468 A1 | 10/2003 | Cain et al. |
| 2003/0202469 A1 | 10/2003 | Cain |
| 2003/0202476 A1 | 10/2003 | Billhartz et al. |
| 2003/0202512 A1 | 10/2003 | Kennedy |
| 2003/0204587 A1 | 10/2003 | Billhartz |
| 2003/0204616 A1 | 10/2003 | Billhartz et al. |
| 2004/0001442 A1 | 1/2004 | Rayment et al. |
| 2004/0022223 A1 | 2/2004 | Billhartz |
| 2004/0022224 A1 | 2/2004 | Billhartz |
| 2004/0028000 A1 | 2/2004 | Billhartz |
| 2004/0028016 A1 | 2/2004 | Billhartz |
| 2004/0029553 A1 | 2/2004 | Cain |
| 2004/0042417 A1 | 3/2004 | Kennedy |
| 2004/0042434 A1 | 3/2004 | Kennedy |
| 2004/0047314 A1 | 3/2004 | Li |
| 2004/0057409 A1 | 3/2004 | Kennedy |
| 2004/0160943 A1 | 3/2004 | Cain |
| 2004/0064568 A1 | 4/2004 | Arora et al. |
| 2004/0064693 A1 | 4/2004 | Pabla et al. |
| 2004/0071086 A1 | 4/2004 | Haumont et al. |
| 2004/0165530 A1 | 8/2004 | Bedekar et al. |
| 2004/0170150 A1 | 9/2004 | Guo et al. |
| 2004/0174900 A1 | 9/2004 | Volpi et al. |
| 2004/0203385 A1 | 10/2004 | Narayanan et al. |
| 2004/0203820 A1 | 10/2004 | Billhartz |
| 2004/0210657 A1 | 10/2004 | Narayanan et al. |
| 2004/0218548 A1 | 11/2004 | Kennedy et al. |
| 2004/0218582 A1 | 11/2004 | Kennedy et al. |
| 2004/0219909 A1 | 11/2004 | Kennedy et al. |
| 2004/0223497 A1 | 11/2004 | Sanderson et al. |
| 2004/0223498 A1 | 11/2004 | Sanderson et al. |
| 2004/0223499 A1 | 11/2004 | Sanderson et al. |
| 2004/0223500 A1 | 11/2004 | Sanderson et al. |
| 2004/0228343 A1 | 11/2004 | Molteni et al. |
| 2004/0229566 A1 | 11/2004 | Wang et al. |
| 2004/0240426 A1 | 12/2004 | Wu et al. |
| 2004/0264466 A1 | 12/2004 | Huang |
| 2005/0041591 A1 | 2/2005 | Duggi et al. |
| 2005/0053003 A1 | 3/2005 | Cain et al. |
| 2005/0053004 A1 | 3/2005 | Cain et al. |
| 2005/0053005 A1 | 3/2005 | Cain et al. |
| 2005/0053007 A1 | 3/2005 | Bernhardt et al. |
| 2005/0053094 A1 | 3/2005 | Cain et al. |
| 2005/0054346 A1 | 3/2005 | Windham et al. |
| 2005/0063458 A1 | 3/2005 | Miyake et al. |
| 2005/0086300 A1 | 4/2005 | Yeager et al. |
| 2005/0089005 A1 | 4/2005 | Sakoda et al. |
| 2005/0094558 A1 | 5/2005 | Lu |
| 2005/0141476 A1 | 6/2005 | Choi et al. |
| 2005/0141706 A1 | 6/2005 | Regli et al. |
| 2005/0152333 A1 | 7/2005 | Smith |
| 2005/0157661 A1 | 7/2005 | Cho |
| 2005/0180320 A1 | 8/2005 | Yeh |
| 2005/0190784 A1 | 9/2005 | Stine |
| 2005/0195749 A1 | 9/2005 | Elmasry et al. |
| 2005/0243852 A1 | 11/2005 | Bitar et al. |
| 2005/0254473 A1 | 11/2005 | Preguica et al. |
| 2005/0259577 A1 | 11/2005 | Sin |
| 2005/0259588 A1 | 11/2005 | Preguica |
| 2005/0259595 A1 | 11/2005 | Preguica |
| 2005/0265259 A1 | 12/2005 | Thubert et al. |
| 2005/0276608 A1 | 12/2005 | Pavelchek |
| 2006/0002328 A1 | 1/2006 | Naghian |
| 2006/0007863 A1 | 1/2006 | Naghian |
| 2006/0023632 A1 | 2/2006 | Ozer et al. |
| 2006/0030318 A1 | 2/2006 | Moore et al. |
| 2006/0067213 A1 | 3/2006 | Evans et al. |
| 2006/0067257 A1 | 3/2006 | Bonta |
| 2006/0087974 A1* | 4/2006 | Ozer ............ H04L 47/11 370/235 |
| 2006/0092043 A1 | 5/2006 | Lagassey |
| 2006/0092845 A1 | 5/2006 | Kwan et al. |
| 2006/0095199 A1 | 5/2006 | Lagassey |
| 2006/0098604 A1 | 5/2006 | Flammer et al. |
| 2006/0126535 A1 | 6/2006 | Sherman |
| 2006/0167784 A1 | 7/2006 | Hoffberg |
| 2006/0176829 A1 | 8/2006 | McLaughlin et al. |
| 2006/0187874 A1 | 8/2006 | Zaki |
| 2006/0215556 A1 | 9/2006 | Wu et al. |
| 2006/0227724 A1 | 10/2006 | Thubert et al. |
| 2006/0229090 A1 | 10/2006 | LaDue |
| 2006/0251115 A1 | 11/2006 | Haque et al. |
| 2006/0268792 A1 | 11/2006 | Belcea |
| 2006/0274680 A1 | 12/2006 | Zhu et al. |
| 2006/0291404 A1 | 12/2006 | Thubert et al. |
| 2006/0291485 A1 | 12/2006 | Thubert et al. |
| 2006/0291864 A1 | 12/2006 | Pavelchek |
| 2007/0038743 A1 | 2/2007 | Hellhake et al. |
| 2007/0047514 A1 | 3/2007 | Rayment et al. |
| 2007/0076726 A1 | 4/2007 | Weston et al. |
| 2007/0087756 A1 | 4/2007 | Hoffberg |
| 2007/0087758 A1 | 4/2007 | Norris et al. |
| 2007/0110024 A1 | 5/2007 | Meier |
| 2007/0153737 A1 | 7/2007 | Singh et al. |
| 2007/0153764 A1 | 7/2007 | Thubert et al. |
| 2007/0195702 A1 | 8/2007 | Yuen et al. |
| 2007/0206547 A1 | 9/2007 | Gong et al. |
| 2007/0214046 A1 | 9/2007 | Falchuk et al. |
| 2007/0223436 A1 | 9/2007 | Lenardi et al. |
| 2007/0229231 A1 | 10/2007 | Hurwitz et al. |
| 2007/0280174 A1 | 12/2007 | Pun |
| 2007/0286097 A1 | 12/2007 | Davies |
| 2007/0297808 A1 | 12/2007 | Pavelchek |
| 2008/0040507 A1 | 2/2008 | Hsu et al. |
| 2008/0051036 A1 | 2/2008 | Vaswani et al. |
| 2008/0051099 A1 | 2/2008 | Moore et al. |
| 2008/0056125 A1 | 3/2008 | Kneckt et al. |
| 2008/0062867 A1 | 3/2008 | Lee et al. |
| 2008/0080473 A1 | 4/2008 | Thubert et al. |
| 2008/0117896 A1 | 5/2008 | Romero et al. |
| 2008/0130640 A1 | 6/2008 | Hurwitz et al. |
| 2008/0151834 A1 | 6/2008 | Natarajan |

(56) References Cited

U.S. PATENT DOCUMENTS

| | | |
|---|---|---|
| 2008/0159151 A1 | 7/2008 | Datz et al. |
| 2008/0159358 A1 | 7/2008 | Ruiz et al. |
| 2008/0192713 A1 | 8/2008 | Mighani et al. |
| 2008/0225717 A1 | 9/2008 | Chen et al. |
| 2008/0225737 A1 | 9/2008 | Gong et al. |
| 2008/0240050 A1 | 10/2008 | Pun |
| 2008/0247353 A1 | 10/2008 | Pun |
| 2008/0252485 A1 | 10/2008 | Lagassey |
| 2008/0262893 A1 | 10/2008 | Hoffberg |
| 2008/0267116 A1 | 10/2008 | Kang et al. |
| 2008/0273487 A1 | 11/2008 | Naghian |
| 2008/0291843 A1 | 11/2008 | Sonnenberg et al. |
| 2008/0298250 A1 | 12/2008 | Larsson |
| 2008/0310390 A1 | 12/2008 | Pun et al. |
| 2009/0003216 A1 | 1/2009 | Radunovic et al. |
| 2009/0028064 A1 | 1/2009 | Elmasry et al. |
| 2009/0046688 A1 | 2/2009 | Volpi et al. |
| 2009/0059795 A1 | 3/2009 | Fonseca, Jr. et al. |
| 2009/0061835 A1 | 3/2009 | Schmidt et al. |
| 2009/0062887 A1 | 3/2009 | Mass et al. |
| 2009/0086663 A1 | 4/2009 | Ho et al. |
| 2009/0097490 A1 | 4/2009 | Sanderson et al. |
| 2009/0185508 A1 | 7/2009 | Duke et al. |
| 2009/0210495 A1 | 8/2009 | Wolfson et al. |
| 2009/0215411 A1 | 8/2009 | Tucker et al. |
| 2009/0219194 A1 | 9/2009 | Menouar et al. |
| 2009/0228575 A1 | 9/2009 | Thubert et al. |
| 2009/0232001 A1* | 9/2009 | Gong ............ H04L 47/14 370/236 |
| 2009/0274047 A1 | 11/2009 | Kruys et al. |
| 2009/0310488 A1 | 12/2009 | Mighani et al. |
| 2009/0323519 A1 | 12/2009 | Pun |
| 2010/0014444 A1 | 1/2010 | Ghanadan et al. |
| 2010/0017045 A1 | 1/2010 | Nesler et al. |
| 2010/0020756 A1 | 1/2010 | Kennedy |
| 2010/0091018 A1 | 4/2010 | Tatarchuk et al. |
| 2010/0097957 A1 | 4/2010 | Pirzada et al. |
| 2010/0123572 A1 | 5/2010 | Thubert et al. |
| 2010/0124196 A1 | 5/2010 | Bonar et al. |
| 2010/0125671 A1 | 5/2010 | Thubert et al. |
| 2010/0128653 A1 | 5/2010 | Tateson |
| 2010/0152619 A1 | 6/2010 | Kalpaxis et al. |
| 2010/0165846 A1 | 7/2010 | Yamaguchi et al. |
| 2010/0187832 A1 | 7/2010 | Holland et al. |
| 2010/0208683 A1 | 8/2010 | Rayment et al. |
| 2010/0235285 A1 | 9/2010 | Hoffberg |
| 2010/0254309 A1 | 10/2010 | Mankins et al. |
| 2010/0306280 A1 | 12/2010 | Sapek |
| 2010/0317420 A1 | 12/2010 | Hoffberg |
| 2010/0329274 A1 | 12/2010 | Romero et al. |
| 2011/0004513 A1 | 1/2011 | Hoffberg |
| 2011/0044169 A1* | 2/2011 | Liu ............ H04L 45/026 370/235 |
| 2011/0044172 A1 | 2/2011 | Yim et al. |
| 2011/0066297 A1 | 3/2011 | Saberi et al. |
| 2011/0075627 A1 | 3/2011 | Rayment et al. |
| 2011/0078461 A1 | 3/2011 | Hellhake et al. |
| 2011/0080853 A1 | 4/2011 | Thubert et al. |
| 2011/0085455 A1 | 4/2011 | Wu et al. |
| 2011/0085530 A1 | 4/2011 | Hellhake et al. |
| 2011/0133924 A1 | 6/2011 | Thubert et al. |
| 2011/0187527 A1 | 8/2011 | Goodwill et al. |
| 2011/0204720 A1 | 8/2011 | Ruiz et al. |
| 2011/0205887 A1 | 8/2011 | Wu et al. |
| 2011/0211534 A1 | 9/2011 | Schmidt et al. |
| 2011/0228696 A1 | 9/2011 | Agarwal et al. |
| 2011/0228788 A1 | 9/2011 | Thubert et al. |
| 2011/0231573 A1 | 9/2011 | Vasseur et al. |
| 2011/0235550 A1 | 9/2011 | Adams et al. |
| 2011/0267981 A1 | 11/2011 | Davies |
| 2011/0273568 A1 | 11/2011 | Lagassey |
| 2011/0314504 A1 | 12/2011 | Ruiz-Velasco |
| 2012/0005041 A1 | 1/2012 | Mehta et al. |
| 2012/0008527 A1 | 1/2012 | Le et al. |
| 2012/0039186 A1 | 2/2012 | Vasseur |
| 2012/0039190 A1 | 2/2012 | Vasseur |
| 2012/0044806 A1 | 2/2012 | Park et al. |
| 2012/0063396 A1 | 3/2012 | Rayment et al. |
| 2012/0092984 A1 | 4/2012 | Mighani et al. |
| 2012/0113807 A1 | 5/2012 | Vasseur et al. |
| 2012/0113863 A1 | 5/2012 | Vasseur et al. |
| 2012/0113986 A1 | 5/2012 | Shaffer et al. |
| 2012/0116559 A1 | 5/2012 | Davis et al. |
| 2012/0117208 A1 | 5/2012 | Shaffer et al. |
| 2012/0117213 A1 | 5/2012 | Shaffer et al. |
| 2012/0117268 A1 | 5/2012 | Shaffer et al. |
| 2012/0117438 A1 | 5/2012 | Shaffer et al. |
| 2012/0134548 A1 | 5/2012 | Rhoads et al. |
| 2012/0147746 A1 | 6/2012 | Shaffer et al. |
| 2012/0147749 A1 | 6/2012 | Moon et al. |
| 2012/0154633 A1 | 6/2012 | Rodriguez |
| 2012/0155260 A1 | 6/2012 | Vasseur et al. |
| 2012/0155276 A1 | 6/2012 | Vasseur et al. |
| 2012/0155284 A1 | 6/2012 | Shaffer et al. |
| 2012/0155329 A1 | 6/2012 | Shaffer et al. |
| 2012/0155397 A1 | 6/2012 | Shaffer et al. |
| 2012/0155463 A1 | 6/2012 | Vasseur et al. |
| 2012/0155475 A1 | 6/2012 | Vasseur et al. |
| 2012/0155511 A1 | 6/2012 | Shaffer et al. |
| 2012/0158933 A1 | 6/2012 | Shetty et al. |
| 2012/0182867 A1 | 7/2012 | Farrag et al. |
| 2012/0188968 A1 | 7/2012 | Mie et al. |
| 2012/0208592 A1 | 8/2012 | Davis et al. |
| 2012/0210233 A1 | 8/2012 | Davis et al. |
| 2012/0213124 A1 | 8/2012 | Vasseur et al. |
| 2012/0224743 A1 | 9/2012 | Rodriguez et al. |
| 2012/0230204 A1 | 9/2012 | Vasseur et al. |
| 2012/0230222 A1 | 9/2012 | Shaffer et al. |
| 2012/0230370 A1 | 9/2012 | Shaffer et al. |
| 2012/0233326 A1 | 9/2012 | Shaffer et al. |
| 2012/0233485 A1 | 9/2012 | Shaffer et al. |
| 2012/0242501 A1 | 9/2012 | Tran et al. |
| 2012/0243621 A1 | 9/2012 | Hurwitz et al. |
| 2012/0254338 A1 | 10/2012 | Agarwal et al. |
| 2012/0257581 A1 | 10/2012 | De |
| 2012/0275642 A1 | 11/2012 | Aller et al. |
| 2012/0277893 A1 | 11/2012 | Davis et al. |
| 2012/0280908 A1 | 11/2012 | Rhoads et al. |
| 2012/0282905 A1 | 11/2012 | Owen |
| 2012/0282911 A1 | 11/2012 | Davis et al. |
| 2012/0284012 A1 | 11/2012 | Rodriguez et al. |
| 2012/0284122 A1 | 11/2012 | Brandis |
| 2012/0284339 A1 | 11/2012 | Rodriguez |
| 2012/0284593 A1 | 11/2012 | Rodriguez |
| 2012/0307624 A1 | 12/2012 | Vasseur et al. |
| 2012/0307629 A1 | 12/2012 | Vasseur et al. |
| 2012/0307652 A1 | 12/2012 | Vasseur et al. |
| 2012/0307653 A1 | 12/2012 | Vasseur et al. |
| 2012/0307825 A1 | 12/2012 | Hui et al. |
| 2012/0316696 A1 | 12/2012 | Boardman et al. |
| 2012/0320768 A1 | 12/2012 | Shaffer et al. |
| 2012/0320790 A1 | 12/2012 | Shaffer et al. |
| 2012/0320923 A1 | 12/2012 | Vasseur et al. |
| 2012/0324273 A1 | 12/2012 | Shaffer et al. |
| 2013/0010590 A1 | 1/2013 | Vasseur et al. |
| 2013/0010615 A1 | 1/2013 | Hui et al. |
| 2013/0010798 A1 | 1/2013 | Shaffer et al. |
| 2013/0013806 A1 | 1/2013 | Woo et al. |
| 2013/0013809 A1 | 1/2013 | Vasseur et al. |
| 2013/0016612 A1 | 1/2013 | Vasseur et al. |
| 2013/0016757 A1 | 1/2013 | Hui et al. |
| 2013/0016758 A1 | 1/2013 | Hui et al. |
| 2013/0016759 A1 | 1/2013 | Hui et al. |
| 2013/0018993 A1 | 1/2013 | Hui et al. |
| 2013/0019005 A1 | 1/2013 | Hui et al. |
| 2013/0022042 A1 | 1/2013 | Vasseur et al. |
| 2013/0022046 A1 | 1/2013 | Vasseur et al. |
| 2013/0022053 A1 | 1/2013 | Vasseur et al. |
| 2013/0022083 A1 | 1/2013 | Vasseur et al. |
| 2013/0022084 A1 | 1/2013 | Vasseur et al. |
| 2013/0024149 A1 | 1/2013 | Nayar et al. |
| 2013/0024560 A1 | 1/2013 | Vasseur et al. |
| 2013/0028095 A1 | 1/2013 | Vasseur et al. |
| 2013/0028103 A1 | 1/2013 | Hui et al. |

(56) References Cited

U.S. PATENT DOCUMENTS

| | | |
|---|---|---|
| 2013/0028104 A1 | 1/2013 | Hui et al. |
| 2013/0028140 A1 | 1/2013 | Hui et al. |
| 2013/0028143 A1 | 1/2013 | Vasseur et al. |
| 2013/0028295 A1 | 1/2013 | Hui et al. |
| 2013/0031253 A1 | 1/2013 | Hui et al. |
| 2013/0045759 A1 | 2/2013 | Smith |
| 2013/0051250 A1 | 2/2013 | Shaffer et al. |
| 2013/0055383 A1 | 2/2013 | Shaffer et al. |
| 2013/0064072 A1 | 3/2013 | Vasseur et al. |
| 2013/0067063 A1 | 3/2013 | Vasseur et al. |
| 2013/0069780 A1 | 3/2013 | Tran et al. |
| 2013/0075484 A1 | 3/2013 | Rhee et al. |
| 2013/0080307 A1 | 3/2013 | Hoffberg |
| 2013/0083658 A1 | 4/2013 | Vasseur et al. |
| 2013/0086601 A1 | 4/2013 | Adimatyam et al. |
| 2013/0088999 A1 | 4/2013 | Thubert et al. |
| 2013/0089011 A1 | 4/2013 | Alapuranen |
| 2013/0094536 A1 | 4/2013 | Hui et al. |
| 2013/0094537 A1 | 4/2013 | Hui et al. |
| 2013/0111038 A1 | 5/2013 | Girard |
| 2013/0121331 A1 | 5/2013 | Vasseur et al. |
| 2013/0122807 A1 | 5/2013 | Tenarvitz et al. |
| 2013/0124883 A1 | 5/2013 | Addepalli et al. |
| 2013/0128773 A1 | 5/2013 | Thubert et al. |
| 2013/0151563 A1 | 6/2013 | Addepalli et al. |
| 2013/0169838 A1 | 7/2013 | Rodriguez et al. |
| 2013/0177025 A1 | 7/2013 | Hurwitz et al. |
| 2013/0178718 A1 | 7/2013 | Tran et al. |
| 2013/0183952 A1 | 7/2013 | Davis et al. |
| 2013/0188471 A1 | 7/2013 | Bade et al. |
| 2013/0188513 A1 | 7/2013 | Vasseur et al. |
| 2013/0191688 A1 | 7/2013 | Agarwal et al. |
| 2013/0201891 A1 | 8/2013 | Rodriguez et al. |
| 2013/0215739 A1 | 8/2013 | Zhang |
| 2013/0215942 A1 | 8/2013 | Addepalli et al. |
| 2013/0219045 A1 | 8/2013 | Agarwal et al. |
| 2013/0219046 A1 | 8/2013 | Wetterwald et al. |
| 2013/0219478 A1 | 8/2013 | Mahamuni et al. |
| 2013/0223218 A1 | 8/2013 | Vasseur et al. |
| 2013/0223225 A1 | 8/2013 | Hui et al. |
| 2013/0223229 A1 | 8/2013 | Hui et al. |
| 2013/0223237 A1 | 8/2013 | Hui et al. |
| 2013/0223275 A1 | 8/2013 | Vasseur et al. |
| 2013/0227055 A1 | 8/2013 | Vasseur et al. |
| 2013/0227114 A1 | 8/2013 | Vasseur et al. |
| 2013/0227336 A1 | 8/2013 | Agarwal et al. |
| 2013/0250754 A1 | 9/2013 | Vasseur et al. |
| 2013/0250808 A1 | 9/2013 | Hui et al. |
| 2013/0250809 A1 | 9/2013 | Hui et al. |
| 2013/0250811 A1 | 9/2013 | Vasseur et al. |
| 2013/0250866 A1 | 9/2013 | Hui et al. |
| 2013/0250945 A1 | 9/2013 | Hui et al. |
| 2013/0250953 A1 | 9/2013 | Hui et al. |
| 2013/0250969 A1 | 9/2013 | Hui et al. |
| 2013/0251053 A1 | 9/2013 | Hui et al. |
| 2013/0251054 A1 | 9/2013 | Hui et al. |
| 2013/0259096 A1 | 10/2013 | Romero et al. |
| 2013/0279365 A1 | 10/2013 | Hui et al. |
| 2013/0279540 A1 | 10/2013 | Hui et al. |
| 2013/0283347 A1 | 10/2013 | Hui et al. |
| 2013/0283360 A1 | 10/2013 | Hui et al. |
| 2013/0286942 A1 | 10/2013 | Bonar et al. |
| 2013/0290560 A1 | 10/2013 | Chaki |
| 2013/0294244 A1 | 11/2013 | Fujita et al. |
| 2013/0308495 A1 | 11/2013 | Tucker et al. |
| 2013/0310896 A1 | 11/2013 | Mass |
| 2013/0315131 A1 | 11/2013 | Brown et al. |
| 2013/0336316 A1 | 12/2013 | Sudhaakar et al. |
| 2014/0006893 A1 | 1/2014 | Shetty et al. |
| 2014/0013117 A1 | 1/2014 | Yun et al. |
| 2014/0016510 A1 | 1/2014 | Clemm et al. |
| 2014/0016643 A1 | 1/2014 | Vasseur et al. |
| 2014/0022906 A1 | 1/2014 | Vasseur et al. |
| 2014/0029432 A1 | 1/2014 | Vasseur et al. |
| 2014/0029445 A1 | 1/2014 | Hui et al. |
| 2014/0029603 A1 | 1/2014 | Nomura et al. |
| 2014/0029610 A1 | 1/2014 | Vasseur et al. |
| 2014/0029624 A1 | 1/2014 | Vasseur |
| 2014/0036912 A1 | 2/2014 | Hui et al. |
| 2014/0036925 A1 | 2/2014 | Hui et al. |
| 2014/0055284 A1 | 2/2014 | Tran et al. |
| 2014/0064172 A1 | 3/2014 | Hui et al. |
| 2014/0068105 A1 | 3/2014 | Thubert et al. |
| 2014/0081793 A1 | 3/2014 | Hoffberg |
| 2014/0092752 A1 | 4/2014 | Hui et al. |
| 2014/0092753 A1 | 4/2014 | Vasseur et al. |
| 2014/0092769 A1 | 4/2014 | Shaffer et al. |
| 2014/0092905 A1 | 4/2014 | Hui et al. |
| 2014/0095058 A1 | 4/2014 | Patel et al. |
| 2014/0095864 A1 | 4/2014 | Dasgupta et al. |
| 2014/0105015 A1 | 4/2014 | Hui et al. |
| 2014/0105027 A1 | 4/2014 | Shaffer et al. |
| 2014/0105033 A1 | 4/2014 | Vasseur et al. |
| 2014/0105211 A1 | 4/2014 | Hui et al. |
| 2014/0108643 A1 | 4/2014 | Hui et al. |
| 2014/0114554 A1 | 4/2014 | Lagassey |
| 2014/0114555 A1 | 4/2014 | Lagassey |
| 2014/0121476 A1 | 5/2014 | Tran et al. |
| 2014/0122673 A1 | 5/2014 | Shaffer et al. |
| 2014/0126348 A1 | 5/2014 | Mahamuni et al. |
| 2014/0126354 A1 | 5/2014 | Hui et al. |
| 2014/0126423 A1 | 5/2014 | Vasseur et al. |
| 2014/0126426 A1 | 5/2014 | Vasseur et al. |
| 2014/0126431 A1 | 5/2014 | Hui et al. |
| 2014/0126610 A1 | 5/2014 | Hui et al. |
| 2014/0129734 A1 | 5/2014 | Vasseur et al. |
| 2014/0129876 A1 | 5/2014 | Addepalli et al. |
| 2014/0136881 A1 | 5/2014 | Vasseur et al. |
| 2014/0169171 A1 | 6/2014 | Acker et al. |
| 2014/0195668 A1 | 7/2014 | Selvakumar et al. |
| 2014/0219078 A1 | 8/2014 | Dasgupta et al. |
| 2014/0219103 A1 | 8/2014 | Vasseur et al. |
| 2014/0219114 A1 | 8/2014 | Vasseur et al. |
| 2014/0219133 A1 | 8/2014 | Dasgupta et al. |
| 2014/0222725 A1 | 8/2014 | Vasseur et al. |
| 2014/0222726 A1 | 8/2014 | Mermoud et al. |
| 2014/0222727 A1 | 8/2014 | Vasseur et al. |
| 2014/0222728 A1 | 8/2014 | Vasseur et al. |
| 2014/0222729 A1 | 8/2014 | Dasgupta et al. |
| 2014/0222730 A1 | 8/2014 | Vasseur et al. |
| 2014/0222731 A1 | 8/2014 | Mermoud et al. |
| 2014/0222748 A1 | 8/2014 | Mermoud et al. |
| 2014/0222975 A1 | 8/2014 | Vasseur et al. |
| 2014/0222983 A1 | 8/2014 | Dasgupta et al. |
| 2014/0222996 A1 | 8/2014 | Vasseur et al. |
| 2014/0222997 A1 | 8/2014 | Mermoud et al. |
| 2014/0222998 A1 | 8/2014 | Vasseur et al. |
| 2014/0223155 A1 | 8/2014 | Vasseur et al. |
| 2014/0245055 A1 | 8/2014 | Shaffer et al. |
| 2014/0247726 A1 | 9/2014 | Vasseur |
| 2014/0247804 A1 | 9/2014 | Wermuth et al. |
| 2014/0269292 A1 | 9/2014 | Kalkunte et al. |
| 2014/0269402 A1 | 9/2014 | Vasseur et al. |
| 2014/0269413 A1 | 9/2014 | Hui et al. |
| 2014/0269592 A1 | 9/2014 | Addepalli et al. |
| 2014/0269759 A1 | 9/2014 | Thubert et al. |
| 2014/0273920 A1 | 9/2014 | Smith |
| 2014/0281670 A1 | 9/2014 | Vasseur et al. |
| 2014/0286377 A1 | 9/2014 | Shaffer et al. |
| 2014/0297206 A1 | 10/2014 | Silverman |
| 2014/0302774 A1 | 10/2014 | Burke et al. |
| 2014/0304427 A1 | 10/2014 | Vasseur et al. |
| 2014/0307614 A1 | 10/2014 | Ruiz et al. |
| 2014/0314096 A1 | 10/2014 | Hui et al. |
| 2014/0320021 A1 | 10/2014 | Conwell |
| 2014/0321270 A1 | 10/2014 | Wu et al. |
| 2014/0324596 A1 | 10/2014 | Rodriguez |
| 2014/0324833 A1 | 10/2014 | Davis et al. |
| 2014/0328346 A1 | 11/2014 | Hui et al. |
| 2014/0330947 A1 | 11/2014 | Hui et al. |
| 2014/0355425 A1 | 12/2014 | Vasseur et al. |
| 2014/0357295 A1 | 12/2014 | Skomra et al. |
| 2014/0357312 A1 | 12/2014 | Davis et al. |
| 2014/0369550 A1 | 12/2014 | Davis et al. |

(56) References Cited

U.S. PATENT DOCUMENTS

| | | |
|---|---|---|
| 2014/0372577 A1 | 12/2014 | Hui et al. |
| 2014/0372585 A1 | 12/2014 | Hui et al. |
| 2014/0376361 A1 | 12/2014 | Hui et al. |
| 2014/0376377 A1 | 12/2014 | Mikoda et al. |
| 2014/0376427 A1 | 12/2014 | Hui et al. |
| 2014/0379896 A1 | 12/2014 | Vasseur et al. |
| 2014/0379900 A1 | 12/2014 | Dasgupta et al. |
| 2015/0002336 A1 | 1/2015 | Thubert et al. |
| 2015/0003251 A1 | 1/2015 | Shaffer et al. |
| 2015/0003428 A1 | 1/2015 | Woo et al. |
| 2015/0016688 A1 | 1/2015 | Aller |
| 2015/0023174 A1 | 1/2015 | Dasgupta et al. |
| 2015/0023363 A1 | 1/2015 | Hui et al. |
| 2015/0023369 A1 | 1/2015 | Hui et al. |
| 2015/0026268 A1 | 1/2015 | Hui et al. |
| 2015/0030033 A1 | 1/2015 | Vasseur et al. |
| 2015/0043384 A1 | 2/2015 | Hui et al. |
| 2015/0043519 A1 | 2/2015 | Hui et al. |
| 2015/0048528 A1 | 2/2015 | Barton |
| 2015/0055650 A1 | 2/2015 | Bhat et al. |
| 2015/0063365 A1 | 3/2015 | Hui et al. |
| 2015/0071295 A1 | 3/2015 | Hui et al. |
| 2015/0072728 A1 | 3/2015 | Rodriguez et al. |
| 2015/0180995 A1 | 6/2015 | Hofmann |
| 2015/0210153 A1 | 7/2015 | Yang et al. |
| 2015/0211616 A1 | 7/2015 | Yang et al. |
| 2015/0295786 A1 | 10/2015 | Levesque et al. |
| 2016/0050582 A1 | 2/2016 | Kruys et al. |
| 2016/0182170 A1 | 6/2016 | Daoura et al. |
| 2016/0211981 A1 | 7/2016 | Acker et al. |
| 2016/0294493 A2 | 10/2016 | Daoura et al. |
| 2016/0315865 A1 | 10/2016 | Kalkunte et al. |
| 2016/0325614 A1 | 11/2016 | Yang et al. |
| 2016/0373997 A1 | 12/2016 | Petersen et al. |
| 2017/0013533 A1 | 1/2017 | Felemban et al. |
| 2017/0070432 A1 | 3/2017 | Hofmann |
| 2017/0212511 A1 | 7/2017 | Paiva Ferreira et al. |
| 2017/0373775 A1 | 12/2017 | Daoura et al. |
| 2018/0014241 A1 | 1/2018 | Perdomo |
| 2018/0097647 A1 | 4/2018 | Acker et al. |
| 2018/0123950 A1 | 5/2018 | Garg et al. |
| 2018/0130347 A1 | 5/2018 | Ricci et al. |
| 2018/0131455 A1 | 5/2018 | Daoura et al. |
| 2018/0152879 A1 | 5/2018 | Petersen et al. |
| 2018/0241488 A1 | 8/2018 | Daoura et al. |
| 2018/0241489 A1 | 8/2018 | Daoura et al. |
| 2018/0309643 A1 | 10/2018 | Levesque et al. |
| 2018/0343200 A1 | 11/2018 | Jana et al. |
| 2018/0359039 A1 | 12/2018 | Daoura et al. |
| 2019/0053106 A1 | 2/2019 | Russell et al. |
| 2019/0068697 A2 | 2/2019 | Darby |
| 2019/0357308 A1* | 11/2019 | Kurian .................... H04W 4/70 |

* cited by examiner

*Neighbor-overload is ON if a packet with overload flag ON was received within the previous OVERLOAD_STATUS_EXPIRY seconds, else it is OFF

METHOD FOR UTILIZATION-BASED TRAFFIC THROTTLING IN A WIRELESS MESH NETWORK

CROSS REFERENCE TO RELATED APPLICATIONS

This application claims benefit of priority under 35 U.S.C. § 119(e), and is a non-provisional of, U.S. Provisional Patent Application No. 62/816,037, filed Mar. 8, 2019, which is expressly incorporated herein by reference in its entirety.

FIELD OF THE INVENTION

The present invention relates to the field of multi-hop wireless networking, and more particularly to traffic control in a decentralized control network.

BACKGROUND OF THE INVENTION

All references and patent literature cited herein is expressly incorporated herein by reference in its entirety.

In a decentralized control communication network, there is a risk that the demand for communication capacity exceeds the available resources. This issue is inherent in the decentralization, though the risk varies for different protocols and network contexts. In "reliable" networks, packets that cannot be transmitted may simply be ignored, with a higher "reliability" level of the protocol managing retransmission and ensuring end-to-end communication of the message. However, this strategy adds substantial administrative overhead to the communication stream, and tends to fail as the load on the network grows. In particular, such networks, using a congestion sense technique, will increase retransmission as reliability falls, leading to even greater congestion and failed communications due to the collisions.

The data carrying capacity of any network has inherent limitations governed by the data rate at which nodes are able to send packets. While the capacity of today's Internet is huge thanks to terabit optical links and other technologies, the capacity of a wireless network—and in particular a wireless mesh or mobile ad hoc network—is severely constrained due to the characteristics of the wireless medium and the transmission hardware.

In such networks, if the offered load by applications exceeds the capacity, the network is forced to drop or excessively delay packets. Typically, the application(s) or user(s) is (are) unaware of the overload and continue to transmit at their preferred rate. This exacerbates the situation in wireless mesh networks, especially those using a contention-based approach to media access control, such as Carrier Sense Multiple Access (CSMA). Specifically, the load causes more collisions, resulting in more retransmissions, which cause even more collisions and so on. A technical term for this is congestion collapse. In wireless mesh networks therefore, it is imperative that the load at a node or a group of nodes be kept below a threshold. In order to do this, there are two functions that are needed at the highest level: (a) detecting overload (congestion); and (b) conveying this information to sources of traffic so that they can throttle back.

One of the earliest considerations of this problem was in the early Internet days with Explicit Congestion Notification (ECN), a bit that is set on packets from to inform the source that there is congestion along the path. When ECN is successfully negotiated, an ECN-aware router may set a mark in the IP header instead of dropping a packet in order to signal impending congestion. The receiver of the packet echoes the congestion indication to the sender, which reduces its transmission rate as if it detected a dropped packet (see, en.wikipedia.org/wiki/Explicit_Congestion_Notification). However, since the media access in wireless mesh networks is very different in the Internet, such solutions are not applicable to our problem.

While there is some academic literature on this subject for wireless multi-hop networks (see for example the survey in onlinelibrary.wiley.com/doi/abs/10.1002/wcm.524), these works are largely in the context of TCP and do not reflect the realities of operation using dissimilar protocols. In any case, because network protocols differ, and usage contexts differ, there remains a need for additional methods of managing network congestion in ad hoc networks, and in particular low bandwidth networks that minimize administrative overhead in transmissions.

A first conventional method of congestion control uses an explicit congestion control message. According to this method, each node maintains a route depending on an outgoing rate and an incoming rate for its efficient medium access control. Each node also monitors a backpressure indicative of a difference between the outgoing rate and the incoming rate. The rate control aims to maintain the backpressure approaching 0 for a local node. If the backpressure is greater than 0, the congestion occurs. If congestion occurs, a downstream node (or receiver) transmits a Congestion Control Request (CCR) message indicating the congestion state to an upstream node (or sender). Upon receiving the message, the sender applies rate control to relieve the congestion around the receiver and transmits a Congestion Control Response message back to the receiver. The CCR/CCP messages can only regulate the packet incoming rate from the current sender. To avoid new neighbors sending packets to the congested receiver, the receiver has to send a Neighborhood Congestion Announcement message to all neighbors. However, this conventional method may also cause congestion by casting additional control messages to the node (receiver) where the congestion state has already occurred. In addition, the three added new frames reduce the efficiency of the network.

A second conventional method uses an Acknowledge Character (ACK) as a congestion notification. According to this method, if congestion occurs, a receiver transmits congestion notification information to a sender using an ACK frame. In response, the sender adjusts the packet transmission rate. However, in this conventional method, the ACK frame is transmitted only to the node that has transmitted data. Therefore, other nodes that have not transmitted data cannot receive the ACK frame. As a result, the receiver may receive data from neighboring nodes that did not to receive the ACK frame even in the congestion state. This will subsequently cause an increase in the congestion.

A third conventional method indicates the congestion using a beacon frame. According to this method, a node transmits a notification indicating its own congestion level to another node using a selected beacon frame. The neighboring nodes also transmit notifications indicating their own states using a selected beacon frame. Upon receiving the notification indicating the congestion level, each node adjusts its transmission rate. In this conventional method, time blanks may exist since the beacon frame is periodically transmitted. This is because when the congestion occurs, the congestion node cannot inform its neighbors until a next beacon time arrives. This results in further neglecting the congestion state until a transmission period of the beacon frame arrives. In addition, even though the congestion has been removed, this method can only announce it when the next beacon time arrives, making the network throughput inefficient. Moreover, the mesh network system, compared with the single-hop network, needs more complex scheduling in order to prevent beacon frames from colliding with each other.

An Ad-Hoc wireless network frequently includes nodes with a high concentration of traffic (e.g., packets, etc.). This traffic may be self-generated by a node with high traffic concentration, or be provided to that node from the network for relay to other network nodes. Network congestion tends to occur when these high concentration nodes are not bypassed, thereby resulting in packets being dropped and degradation of network throughput. In order to avoid this situation, the congestion of a network node is measured and sent to other network nodes in order to enable routing to bypass the congested area. Congestion may be measured utilizing common techniques that measure queue utilization (i.e., the percentage of the storage capacity of a queue within a node being occupied by packets), packet drop rate (i.e., the rate packets are dropped from the node queue, or due to collisions), link failure rate (i.e., the link quality with respect to the percentage of packets that cannot be successfully transmitted using the link) and channel loading (i.e., the percentage a channel is utilized for sending traffic). Typically, congestion is sampled at a constant rate with the results being averaged. The congested nodes are subsequently identified and bypassed based upon the congestion measurements. This may be accomplished by various conventional techniques. For example, a secondary route may be determined to bypass the primary routes that are congested. Further, several routes may be defined concurrently between source and destination nodes. When one of these routes is congested, another route may be utilized. Moreover, the congestion metric may be piggybacked within the transmission of the routing table (i.e., distance vector routing) or within the transmission of a Link State Advertisement (LSA) (i.e., link-state based routing).

The various techniques suffer from several disadvantages. In particular, the congestion measurements may not provide an accurate measurement of true congestion. For example, the queue utilization measurement depends upon the size of the node queue. When the queue has a small storage capacity, small amounts of traffic may cause the queue utilization percentage to increase sufficiently to indicate congestion. If the queue has a large storage capacity, the queue may not be sufficiently filled and provide a low queue utilization percentage even though conditions include heavy traffic. The packet drop rate measurement is similarly connected to node queue size. A small queue storage capacity may easily drop packets even though there is no traffic congestion. A large queue storage capacity may store many packets, where no packets are dropped even though congestion has already occurred. Further, the link failure rate may not accurately indicate the presence of congestion since link failure may be attributed to loss of radio connectivity due to mobility of network nodes. Link failure may further be attributed to a poor radio channel due to fading and multipath interferences. Thus, a high link failure rate may not necessarily indicate occurrence of congestion. In many cases, the remedial strategy for link failure vs. congestion is different, and in particular, a congested node may be operating at high efficiency, while a failed link is inoperative or operating at low efficiency.

In addition, channel loading is commonly measured by periodically sampling the channel. The channel loading value is one when the channel is busy, and zero if the channel is idle. This limitation of values is very coarse, and provides an inaccurate average due to the averaging of both busy and idle channel values. Further, the constant sampling for the measurement wastes processor power since measurements are performed for idle channels. With respect to bypassing congested areas, determination of a secondary route (besides the primary routes) or plural routes requires the transmission of control packets to discover the routes. This significantly increases overhead and reduces the effectiveness of these techniques. Although a utilization measurement may be used to update the contention interval when a network node needs to access a communication channel using a Carrier Sense Multiple Access (CSMA) based protocol, this provides occasional or limited advantages based on simulation.

Conventional techniques send the congestion measurements within a broadcast of routing tables, or within a flood of Link State Advertisements (LSA). However, network nodes may not receive these items since congestion (or link loss) may have already occurred. This enables packets to be dropped due to the congestion.

U.S. Pat. No. 9,655,006 discloses a system and method which uses RTS-CTS and a duration field in the CTS to indicate congestion. This provides a purely local scope. Thus, while all of the neighboring nodes can participate in the congestion control, non-neighboring nodes are not fully addressed.

U.S. Pat. No. 8,861,620 provides a solution to congestion based on queue lengths.

U.S. Pat. No. 8,331,396 identifies congestion at the Medium Access Control (MAC) layer, but uses that information only to control a contention window, and not to directly throttle traffic.

U.S. Pat. No. 8,089,884 uses utilization to measure congestion (overload), and to re-route packets in dependence on the congestion. Congestion is measured in the context of a hybrid CSMA/TDMA system, and uses the transmit time only. This technique bypasses congested links in a multi-hop Ad-Hoc wireless network to avoid dropping packets and degrading throughput. Initially, congestion is measured at each network node based on channel utilization for both transmission and reception of Time Division Multiple Access (TDMA) and Carrier Sense Multiple Access (CSMA) messages. The measured utilization is quantized to conserve transmission bandwidth. Non-uniform quantization is applied to enable the measured utilization to be quantized to the highest value within the quantization range prior to occurrence of congestion, thereby effectively providing early notification of the congestion. The quantized utilization is distributed with the original use costs of a communication link to the remaining network nodes by a Link State Advertisement (LSA) flood. Supplemental mechanisms (e.g., ACK and HELLO messages or packets) are utilized to increase the distribution reliability. After a network node receives the quantized utilization, the link cost is updated and used to select a routing path that minimizes the total costs from the source node to the destination node for a multi-hop network. No additional overhead is needed to select a secondary path to bypass the congested links.

U.S. Pat. No. 7,911,962 uses the equivalent of utilization which is similar to U.S. Pat. No. 8,089,884. A distributed multi-path QoS-aware routing scheme is provided that considers basic MANET characteristics (e.g., neighborhood congestion and path stability) to meet the transport service requirements of real-time applications is provided. In a preferred embodiment, the QoS Routing scheme superimposes a distributed neighborhood congestion parameter, a neighborhood density parameter, a link stability parameter and a delay information parameter over multiple discovered paths when it calculates a next hop decision. At each routing hop along the path, network traffic is dispatched along the appropriate next-hop according to the path's QoS metrics that are computed from network conditions such as previous and projected neighborhood congestion level, link stability, link rate, link quality, and neighborhood density. This allows networks to better adapt to rapidly changing MANET environments such as those found, for example, in airborne tactical edge networks. Each of the network communication nodes may include a communications link that provides communications with neighboring network communication nodes within the network and a controller coupled to the communications link. The controller determines a local congestion metric and transmits the local congestion metric to neighboring network communication nodes via the communications link. The controller then receives local congestion metrics from the neighboring network communication nodes via the communication link and calculates a neighborhood congestion indicator. The neighborhood congestion indicator is used by the controller to calculate a path remaining available bandwidth from the controller's node to at least one destination node within the network for each path from the controller's node to the destination node. The controller then selects a next hop in the desired path for transmission of data via the communication link from the controller's node to the destination node based on the calculated path remaining available bandwidths. The controller may calculate the local congestion metric based on the percentage of time the controller's node is transmitting Non-Best-Effort traffic (namely traffic that requires qualitative or quantitative transport guarantees from the network); a neighborhood congestion indicator as the sum of the local congestion metrics from its 1-hop neighbors; a total neighborhood congestion indicator as the sum of the local congestion metrics from its 1-hop neighbors plus its own local congestion metric; and/or the path remaining available bandwidth based upon the distance to the destination node. The path remaining available bandwidth calculation may include either a one-hop calculation, a two-hop calculation or a three-hop calculation. Additional parameters or metrics may also be calculated and utilized to select the desired transmission path including an interference cost metric, a path stability metric, and a path delay metric. These metrics, along with the path remaining available bandwidths, can be incorporated into a weighted objective function to select the desired path. Preference may also be given to previously selected paths.

U.S. Pat. No. 7,843,817 uses queue lengths to identify congestion. Mesh nodes monitor their own access class (AC) queues for congestion. If a given mesh node detects congestion at one or more AC queues, the mesh node determines a congestion control mode based on the degree of congestion (e.g., a predefined number of packets in the congested AC queue or a percentage of the queue that is filled). The mesh node then sends congestion control messages to upstream nodes. A congestion control message may request that the receiving upstream node reduce traffic (e.g., stop or slow down traffic) or increase traffic (e.g., resume or speed up traffic). The congestion control message may indicate one or more sources of congestion. The mesh node receiving the congestion control message adjusts traffic (e.g., reduces or increases traffic) for all downstream mesh nodes. If a mesh node goes into a stop mode, the mesh node buffers all traffic from the upstream node(s). If the mesh node goes into a slow mode, the mesh node remaps traffic from the signaling upstream mesh nodes to the next lowest priority AC queue. The mesh node receiving the congestion control message may selectively adjust traffic for the congested downstream mesh nodes. If the mesh node goes into a selective-stop mode the mesh node may buffer all traffic to an identified congested node identified in the congestion control message. In a selective-slow mode, the mesh node may remap traffic to one or more congested nodes identified in the congestion control message to the next lowest priority AC queue. The congestion control messages may be transmitted to either parent or child nodes (or to both parent and child nodes) depending on the AC transmit queues experiencing congestion and depending on the transmitter of frames in the queues.

See, U.S. Pat. and Pub. Patent Appl. Nos. U.S. Pat. Nos. 4,496,886; 5,844,905; 6,674,721; 6,714,517; 6,728,211; 6,757,263; 6,765,870; 6,937,602; 6,982,982; 6,999,441; 7,072,618; 7,164,667; 7,403,496; 7,489,635; 7,561,514; 7,693,051; 7,693,105; 7,697,454; 7,710,870; 7,738,372; 7,773,559; 7,787,366; 7,792,059; 7,835,273; 7,843,817; 7,852,764; 7,911,962; 7,912,003; 8,009,562; 8,089,884; 8,233,389; 8,331,396; 8,462,691; 8,483,066; 8,520,578; 8,605,591; 8,675,678; 8,681,620; 8,817,709; 8,861,620; 8,923,910; 8,958,339; 8,982,708; 9,185,598; 9,215,620; 9,319,922; 9,407,552; 9,503,891; 9,503,926; 9,559,963; 9,655,006; 9,774,410; 9,847,887; 9,900,119; 10,063,331; 20010036157; 20020136163; 20020163933; 20020191573; 20030002442; 20030028585; 20030033394; 20030041141; 20030055894; 20030070070; 20030076837; 20030128687; 20030174682; 20030204587; 20030204616; 20040001442; 20040047314; 20040064568; 20040064693; 20040071086; 20040165530; 20040170150; 20040203820; 20040229566; 20040240426; 20050063458; 20050086300; 20050089005; 20050094558; 20050141476; 20050152333; 20050180320; 20050190784; 20050195749; 20050243852; 20050259577; 20060067213; 20060067257; 20060092845; 20060098604; 20060187874; 20060215556; 20060268792; 20060274680; 20070047514; 20070076726; 20070195702; 20070206547; 20080056125; 20080062867; 20080080473; 20080151834; 20080192713; 20080225717; 20080225737; 20080298250; 20090003216; 20090028064; 20090059795; 20090232001; 20090274047; 20090310488; 20100020756; 20100091018; 20100123653; 20100165846; 20100208683; 20100306280; 20110044172; 20110066297; 20110075627; 20110085455; 20110205887; 20120008527; 20120044806; 20120063396; 20120092984; 20120147746; 20120147749; 20120182867; 20120257581; 20120316696; 20130075484; 20130294244; 20140013117; 20140016510; 20140095058; 20140169171; 20140269292; 20140321270; 20140376377; 20150048528; 20150180995; 20150210153; 20150211616; 20150295786; 20160050582; 20160182170; 20160211981; 20160294493; 20160315865; 20160325614; 20160373997; 20170013533; 20170070432; 20170212511; 20170373775; 20180097647; 20180123950; 20180130347; 20180131455; 20180152879; 20180241488; 20180241489; 20180309643; 20180343200; 20180359039; 20190053106; and 20190068697;

Ahn, Gahng-Seop, Andrew T. Campbell, Andras Veres, and Li-Hsiang Sun. "SWAN: Service differentiation in stateless wireless ad hoc networks." In Proceedings. Twenty-First Annual Joint Conference of the IEEE Computer and Communications Societies, vol. 2, pp. 457-466. IEEE, 2002.

Blough, D. et al., "Topology control with better radio models: Implications for energy and multi-hop interference", Science Direct, Received Jan. 10, 2006; revised Jun. 1, 2006. Available online Oct. 11, 2006, pp. 379-398.

Camp, J. et al., "Measurement Driven Deployment of a Two-Tier Urban Mesh Access Network", Rice Networks Group, MobiSys 2006, Jun. 20, 2006.

Campolo, Claudia, and Antonella Molinaro. "Multichannel communications in vehicular ad hoc networks: a survey." IEEE Communications Magazine 51, no. 5 (2013): 158-169.

Chakeres, I. et al., Dynamic MANET on-demand (DYMO) Routing draft-ieft-manet-dymo-05, Feb. 7, 2008.

Chen, Dazhi, and Pramod K. Varshney. "QoS Support in Wireless Sensor Networks: A Survey." In International conference on wireless networks, vol. 233, pp. 1-7. 2004.

Chen, Kai, Yuan Xue, and Klara Nahrstedt. "On setting TCP's congestion window limit in mobile ad hoc networks." In IEEE International Conference on Communications, 2003. ICC'03, vol. 2, pp. 1080-1084. IEEE, 2003.

Chen, Lei, and Wendi B. Heinzelman. "QoS-aware routing based on bandwidth estimation for mobile ad hoc networks." IEEE Journal on selected areas in communications 23, no. 3 (2005): 561-572.

Chen, S. et al., Distributed Quality-of-Service Routing in Ad-Hoc Networks, IEEE Journal on Selected Areas in Communication, vol. 17, No. 8 Aug. 1999.

Chen, Xiang, Hongqiang Zhai, Jianfeng Wang, and Yuguang Fang. "TCP performance over mobile ad hoc networks." Canadian Journal of Electrical and Computer Engineering 29, no. 1/2 (2004): 129-134.

Chimento, P. F., "Standard Token Bucket Terminology", May 18, 2000.

Choudhary, S. et al., Path Stability Based Adaptation of MANET Routing Protocols, Distributed Computing—IWDC 2004, Springer Berlin/Hiedleberg, vol. 3326/2005, pp. 198-203.

Clausen, T. et al., The Optimized Link-State Routing Protocol version 2 draft-ietf-manet-olsrv2-02, October 2003.

Conti, Marco, Enrico Gregori, and Gaia Maselli. "Cooperation issues in mobile ad hoc networks." In 24th International Conference on Distributed Computing Systems Workshops, 2004. Proceedings, pp. 803-808. IEEE, 2004.

Duc A. Tran, Harish Raghavendra, "Congestion Adaptive Routing in Mobile Ad Hoc Networks," IEEE Transactions on Parallel and Distributed Systems, vol. 17, No. 11, November 2006.

Fu, Zhenghua, Xiaoqiao Meng, and Songwu Lu. "A transport protocol for supporting multimedia streaming in mobile ad hoc networks." IEEE journal on selected areas in communications 21, no. 10 (2003): 1615-1626.

Gambiroza, Violeta, et al., "End to End Performance and Fairneses in Multihop Wireless Backhaul Networks", Department of Electrical and Computer Engineering, Rice University, Houston, Tex., MobiCom '04, Sep. 26-Oct. 1, 2004.

Gao, J. et al., Load-Balanced Short-Path Routing in Wireless Networks, IEEE Transaction on Parallel and Distributed Systems, vol. 17, No. 4, April 2006.

Ge, Y. et al., Quality of Service Routing in Ad-Hoc Networks Using OLSR 36th Hawaii International Conference on System Sciences (HICSS '03).

Gerasimov, I. et al., Performance Analysis for Ad Hoc QoS Routing Protocols Laboratory for Cooperative Work Environments, Department of Computer Science International Mobility and Wireless Access Workshop (MobiWac '02).

Ghanadan, R. et al., An Efficient Intranet Networking Solution for Airborne Networks, BAE Systems Network Enabled Solutions, presented at the MILCOM 2006 Conference, Washington, D.C., Oct. 23, 2006, IEEE ISBN: 1-4244-0618-8.

Golnaz Karbaschi, Anne Fladenmuller, "A Link-Quality and Congestion-Aware Cross Layer Metric for Multi-Hop Wireless Routing," IEEE, 2005.

Green, Scott, "New Metromesh OS Release 5.1 from Tropos Delivers Next-Generation Metro-Scale Wi-Fi Capacity and Reliability" CLS Communications, Inc., Tropos Networks, Mar. 9, 2006.

Hyung-Won Cho, et al., "A Centralized Hybrid MAC Protocol for Wireless Sensor Networks," Intelligent Sensors, Sensor Networks and Information, 2007. ISSNIP 2007. 3rd International Conference on. Mar. 1, 2008; DOI: 10.1109/ISSNIP.2007.4496886.

Jaewon Kang, Yanyong Zhang, Badri Nath, "Accurate and Energy-Efficient Congestion Level Measurement in Ad Hoc Networks," IEEE Communications Society/WCNC 2005, pp. 2258-2263.

Kang Yong Lee et al., "Cross Layered Hop-by-Hop Congestion Control for Multihop Wireless Networks," 2006 IEEE International Conference on Mobile AdHoc and Sensor Systems, Oct. 1, 2006, pp. 485-488, XP01003866.

Lee, S. et al., $AODV_{BR}$: Backup Routing in Ad hoc Networks Wireless Adaptive Mobility Laboratory, Computer Science Department University of California, Los Angeles.

Li, Mingzhe, Choong-Soo Lee, Emmanuel Agu, Mark Claypool, and Robert Kinicki. "Performance enhancement of TFRC in wireless ad hoc networks." Distributed Multimedia Systems (DMS) (2004).

Liu, Yue, Jun Bi, and Ju Yang. "Research on vehicular ad hoc networks." In 2009 Chinese Control and Decision Conference, pp. 4430-4435. IEEE, 2009.

Lochert, Christian, Bjorn Scheuermann, and Martin Mauve. "A survey on congestion control for mobile ad hoc networks." Wireless communications and mobile computing 7, no. 5 (2007): 655-676.

Mohapatra, Prasant, Jian Li, and Chao Gui. "QoS in mobile ad hoc networks." IEEE Wireless Communications 10, no. 3 (2003): 44-53.

Nahm, Kitae, Ahmed Helmy, and C-C. Jay Kuo. "TCP over multihop 802.11 networks: issues and performance enhancement." In Proceedings of the 6th ACM international symposium on Mobile ad hoc networking and computing, pp. 277-287. ACM, 2005.

Nguyen, D. et al., QoS support and OLSR routing in a mobile ad hoc network International Conference on Networking, International Conference on Systems and International Conference on Mobile Communications and Learning Technologies (ICNICONSMCL '06).

Ramanathan, S. et al., A Survey of Routing Techniques for Mobile Communications Networks, Mobile Networks and Applications, vol. 1, No. 2, pp. 89-104, 1996.

Scheuermann, Bjorn, Christian Lochert, and Martin Mauve. "Implicit hop-by-hop congestion control in wireless multihop networks." Ad Hoc Networks 6, no. 2 (2008): 260-286.

Thilagavathe, V., and Dr K. Duraiswamy. "Cross layer based congestion control technique for reliable and energy aware routing in MANET." International Journal of Computer Applications 36, no. 12 (2011): 1-6.

Wang, Lei, Lianfang Zhang, Yantai Shu, and Miao Dong. "Multipath source routing in wireless ad hoc networks." In 2000 Canadian Conference on Electrical and Computer Engineering. Conference Proceedings. Navigating to a New Era (Cat. No. 00TH8492), vol. 1, pp. 479-483. IEEE, 2000.

Wang, Lei, Yantai Shu, Miao Dong, Lianfang Zhang, and Oliver WW Yang. "Adaptive multipath source routing in ad hoc networks." In ICC 2001. IEEE International Conference on Communications. Conference Record (Cat. No. 01CH37240), vol. 3, pp. 867-871. IEEE, 2001.

Xu Li, Zheng Bao-Yu, "Study on Cross-Layer Design and Power Conservation in Ad Hoc Network," IEEE 2003.

Zhai, Hongqiang, Xiang Chen, and Yuguang Fang. "Improving transport layer performance in multihop ad hoc networks by exploiting MAC layer information." IEEE Transactions on Wireless Communications 6, no. 5 (2007): 1692-1701.

Zhang, Xinming, Nana Li, Wenbo Zhu, and Dan Keun Sung. "TCP transmission rate control mechanism based on channel utilization and contention ratio in ad hoc networks." IEEE Communications Letters 13, no. 4 (2009): 280-282.

The technology may be implemented in the context if a system similar to that disclosed in U.S. 2018/0014241.

In a multihop network, communications are passed from one node to another in series between the source and destination. Because of various risks, as the number of hops grows, the reliability of a communication successfully reaching its destination decreases, such that hop counts of more than 10 or 20 in a mobility permissive network are rarely considered feasible. A typical mesh network protocol maintains a routing table at each node, which is then used to control the communication. This routing table may be established proactively or reactively. In proactive routing, the network state information is pushed to the various nodes, often appended to other communications, such that when a communication is to be established, the nodes rely on the then-current routing information to control the communication. This paradigm suffers from the possibility of stale or incorrect routing information or overly burdensome administrative overhead, or both. Reactive routing seeks to determine the network state at the time of, and for the purpose of, a single communication, and therefore may require significant communications possibly far exceeding the amount of data to be communicated in order to establish a link. Because the network state is requested at the time of communication, there is less opportunity to piggyback the administrative information on other communications. There are also various hybrid ad hoc network routing protocols, which seek to compromise between these two strategies, and other paradigms as well. See, e.g., U.S. Pat. and Pub. Patent Appl. Nos. U.S. Pat. Nos. 6,584,080; 6,625,135; 6,628,620; 6,718,394; 6,754,192; 6,763,013; 6,763,014; 6,870,846; 6,894,985; 6,898,529; 6,906,741; 6,954,435; 6,961,310; 6,975,614; 6,977,608; 6,986,161; 7,007,102; 7,027,426; 7,028,687; 7,068,600; 7,068,605; 7,075,919; 7,079,552; 7,082,117; 7,085,290; 7,096,037; 7,142,866; 7,170,425; 7,176,807; 7,216,282; 7,251,238; 7,266,085; 7,281,057; 7,299,038; 7,299,042; 7,308,369; 7,308,370; 7,317,898; 7,327,998; 7,346,167; 7,348,895; 7,356,001; 7,362,711; 7,366,111; 7,366,544; 7,382,765; 7,389,295; 7,394,798; 7,394,826; 7,418,238; 7,420,944; 7,427,927; 7,428,221; 7,450,517; 7,453,864; 7,457,834; 7,468,954; 7,480,248; 7,495,578; 7,529,561; 7,535,883; 7,536,388; 7,539,759; 7,545,285; 7,567,577; 7,580,730; 7,580,782; 7,581,095; 7,587,001; 7,590,589; 7,599,696; 7,602,738; 7,616,961; 7,656,851; 7,657,354; 7,660,318; 7,660,950; 7,678,068; 7,693,484; 7,695,446; 7,702,594; 7,706,282; 7,706,842; 7,710,932; 7,719,988; 7,725,080; 7,729,336; 7,742,399; 7,742,430; 7,746,794; 7,753,795; 7,764,617; 7,778,235; 7,788,387; 7,808,985; 7,813,451; 7,817,623; 7,830,820; 7,843,861; 7,849,139; 7,852,826; 7,860,025; 7,860,081; 7,860,968; 7,873,019; 7,881,474; 7,886,075; 7,894,828; 7,898,993; 7,902,973; 7,905,640; 7,912,645; 7,924,796; 7,929,914; 7,936,732; 7,941,188; 7,944,878; 7,957,355; 7,961,650; 7,962,101; 7,962,154; 7,969,914; 7,970,418; 7,974,402; 7,978,062; 7,979,311; 7,983,835; 7,990,947; 7,996,558; 8,035,479; 8,040,863; 8,042,048; 8,059,620; 8,060,017; 8,060,308; 8,065,166; 8,065,411; 8,072,906; 8,073,384; 8,090,596; 8,099,108; 8,099,307; 8,108,228; 8,108,429; 8,115,617; 8,121,628; 8,121,870; 8,130,708; 8,131,569; 8,131,838; 8,134,950; 8,135,362; 8,138,934; 8,139,504; 8,144,596; 8,144,619; 8,151,140; 8,161,097; 8,170,577; 8,170,957; 8,171,364; 8,174,381; 8,180,294; 8,184,681; 8,195,483; 8,195,628; 8,200,246; 8,203,463; 8,213,895; 8,239,169; 8,249,984; 8,256,681; 8,266,657; 8,271,449; 8,275,824; 8,289,182; 8,289,186; 8,300,615; 8,311,533; 8,315,231; 8,319,658; 8,319,833; 8,320,302; 8,320,414; 8,323,189; 8,325,612; 8,330,649; 8,332,055; 8,334,787; 8,335,207; 8,335,814; 8,341,279; 8,341,289; 8,345,098; 8,346,846; 8,352,420; 8,359,643; 8,363,662; 8,364,648; 8,369,880; 8,370,697; 8,373,556; 8,373,588; 8,374,352; 8,385,550; 8,386,278; 8,392,541; 8,395,498; 8,396,602; 8,400,507; 8,401,564; 8,406,153; 8,406,239; 8,406,252; 8,428,517; 8,441,958; 8,442,520; 8,447,419; 8,447,849; 8,451,744; 8,463,238; 8,467,991; 8,472,348; 8,473,989; 8,475,368; 8,489,765; 8,494,458; 8,495,244; 8,496,181; 8,502,148; 8,502,640; 8,503,309; 8,504,921; 8,509,762; 8,509,765; 8,514,915; 8,515,547; 8,520,535; 8,520,676; 8,521,156; 8,525,692; 8,527,622; 8,533,758; 8,544,023; 8,547,875; 8,548,607; 8,553,688; 8,559,442; 8,560,274; 8,571,046; 8,571,518; 8,577,391; 8,578,015; 8,578,054; 8,583,671; 8,583,978; 8,587,427; 8,588,108; 8,593,419; 8,593,986; 8,595,359; 8,600,830; 8,612,583; 8,615,257; 8,619,576; 8,619,789; 8,620,772; 8,620,784; 8,621,577; 8,622,837; 8,624,771; 8,625,515; 8,626,344; 8,630,177; 8,630,291; 8,630,314; 8,631,101; 8,636,395; 8,638,667; 8,638,763; 8,652,038; 8,654,627; 8,654,649; 8,665,890; 8,667,084; 8,670,416; 8,675,678; 8,682,982; 8,693,322; 8,699,333; 8,699,368; 8,699,377; 8,700,301; 8,700,302; 8,700,536; 8,707,785; 8,712,711; 8,715,072; 8,718,055; 8,719,563; 8,725,274; 8,727,978; 8,730,047; 8,730,875; 8,732,454; 8,738,944; 8,743,750; 8,743,768; 8,743,866; 8,747,313; 8,751,063; 8,751,644; 8,755,763; 8,756,449; 8,760,339; 8,761,175; 8,761,285; 8,762,852; 8,769,442; 8,774,050; 8,774,946; 8,780,201; 8,780,953; 8,781,462; 8,787,392; 8,787,944; 8,788,516; 8,792,850; 8,792,880; 8,797,878; 8,798,094; 8,799,220; 8,799,510; 8,800,010; 8,804,603; 8,806,633; 8,812,419; 8,817,665; 8,818,522; 8,819,172; 8,819,191; 8,823,795; 8,824,471; 8,830,837; 8,831,279; 8,831,869; 8,832,428; 8,837,277; 8,842,180; 8,842,630; 8,843,156; 8,848,970; 8,855,794; 8,855,830; 8,856,323; 8,861,390; 8,862,774; 8,867,329; 8,868,374; 8,872,379; 8,872,767; 8,872,915; 8,873,391; 8,873,526; 8,874,477; 8,874,788; 8,879,604; 8,879,613; 8,880,060; 8,885,501; 8,885,630; 8,886,227; 8,891,534; 8,891,588; 8,892,271; 8,908,516; 8,908,536; 8,908,621; 8,908,626; 8,918,480; 8,923,186; 8,923,422; 8,930,361; 8,934,366; 8,934,496; 8,937,886; 8,938,270; 8,942,301; 8,948,046; 8,948,229; 8,949,959; 8,954,582; 8,959,539; 8,964,762; 8,964,787; 8,965,288; 8,970,392; 8,970,394; 8,971,188; 8,972,159; 8,976,007; 20020039357; 20020071160; 20020083316; 20030202468; 20030202469; 20030202476; 20030202512; 20030204587; 20030204616; 20040022223; 20040022224; 20040028000; 20040028016; 20040029553; 20040042417; 20040042434; 20040057409;

20040160943; 20040174900; 20040203385; 20040203820; 20040210657; 20040218548; 20040218582; 20040219909; 20040223497; 20040223498; 20040223499; 20040223500; 20040228343; 20040264466; 20050041591; 20050053003; 20050053004; 20050053005; 20050053007; 20050053094; 20050054346; 20050141706; 20050157661; 20050254473; 20050259588; 20050259595; 20050265259; 20050276608; 20060002328; 20060007863; 20060023632; 20060030318; 20060092043; 20060095199; 20060126535; 20060167784; 20060176829; 20060227724; 20060229090; 20060251115; 20060291404; 20060291485; 20060291864; 20070038743; 20070087756; 20070087758; 20070110024; 20070153737; 20070153764; 20070214046; 20070223436; 20070229231; 20070280174; 20070286097; 20070297808; 20080040507; 20080051036; 20080051099; 20080117896; 20080130640; 20080159151; 20080159358; 20080240050; 20080247353; 20080252485; 20080262893; 20080267116; 20080273487; 20080291843; 20080310390; 20090046688; 20090061835; 20090062887; 20090086663; 20090097490; 20090185508; 20090210495; 20090215411; 20090219194; 20090228575; 20090323519; 20100014444; 20100017045; 20100097957; 20100123572; 20100124196; 20100125671; 20100152619; 20100187832; 20100235285; 20100254309; 20100317420; 20100329274; 20110004513; 20110078461; 20110080853; 20110085530; 2011018752720110133924; 20110204720; 20110211534; 20110228696; 20110228788; 20110231573; 20110235550; 20110267981; 20110273568; 20110314504; 20120005041; 20120039186; 20120039190; 20120113807; 20120113863; 20120113986; 20120116559; 20120117208; 20120117213; 20120117268; 20120117438; 20120134548; 20120154633; 20120155260; 20120155276; 20120155284; 20120155329; 20120155397; 20120155463; 20120155475; 20120155511; 20120158933; 20120182867; 20120188968; 20120208592; 20120210233; 20120213124; 20120224743; 20120230204; 20120230222; 20120230370; 20120233326; 20120233485; 20120242501; 20120243621; 20120254338; 20120275642; 20120277893; 20120280908; 20120282905; 20120282911; 20120284012; 20120284122; 20120284339; 20120284593; 20120307624; 20120307629; 20120307652; 20120307653; 20120307825; 20120320768; 20120320790; 20120320923; 20120324273; 20130010590; 20130010615; 20130010798; 20130013806; 20130013809; 20130016612; 20130016757; 20130016758; 20130016759; 20130018993; 20130019005; 20130022042; 20130022046; 20130022053; 20130022083; 20130022084; 20130024149; 20130024560; 20130028095; 20130028103; 20130028104; 20130028140; 20130028143; 20130028295; 20130031253; 20130045759; 20130051250; 20130055383; 20130064072; 20130067063; 20130069780; 20130080307; 20130083658; 20130086601; 20130088999; 20130089011; 20130094536; 20130094537; 20130111038; 20130121331; 20130122807; 20130124883; 20130128773; 20130151563; 20130169838; 20130177025; 20130178718; 20130183952; 20130188471; 20130188513; 20130191688; 20130201891; 20130215739; 20130215942; 20130219045; 20130219046; 20130219478; 20130223218; 20130223225; 20130223229; 20130223237; 20130223275; 20130227055; 20130227114; 20130227336; 20130250754; 20130250808; 20130250809; 20130250811; 20130250866; 20130250945; 20130250953; 20130250969; 20130251053; 20130251054; 20130259096; 20130279365; 20130279540; 20130283347; 20130283360; 20130286942; 20130290560; 20130308495; 20130310896; 20130315131; 20130336316; 20140006893; 20140016643; 20140022906; 20140029432; 20140029445; 20140029603; 20140029610; 20140029624; 20140036912; 20140036925; 20140055284; 20140064172; 20140068105; 20140081793; 20140092752; 20140092753; 20140092769; 20140092905; 20140095864; 20140105015; 20140105027; 20140105033; 20140105211; 20140108643; 20140114554; 20140114555; 20140121476; 20140122673; 20140126348; 20140126354; 20140126423; 20140126876; 20140126431; 20140126610; 20140129734; 20140129876; 20140136881; 20140195668; 20140219078; 20140219103; 20140219114; 20140219133; 20140222725; 20140222726; 20140222727; 20140222728; 20140222729; 20140222730; 20140222731; 20140222748; 20140222975; 20140222983; 20140222996; 20140222997; 20140222998; 20140223155; 20140245055; 20140247726; 20140247804; 20140269402; 20140269413; 20140269592; 20140269759; 20140273920; 20140281670; 20140286377; 20140297206; 20140302774; 20140304427; 20140307614; 20140314096; 20140320021; 20140324596; 20140324833; 20140328346; 20140330947; 20140355425; 20140357295; 20140357312; 20140369550; 20140372577; 20140372585; 20140376361; 20140376427; 20140379896; 20140379900; 20150002336; 20150003251; 20150003428; 20150016688; 20150023174; 20150023363; 20150023369; 20150026268; 20150030033; 20150043384; 20150043519; 20150055650; 20150063365; 20150071295; 20150072728, each of which is expressly incorporated herein by reference in its entirety.

A much older class of wireless communication technologies comprises voice communication on narrowband analog radio channels, such as paired Walkie-Talkies and Citizens Band (CB) Radio. The set of Citizen's Band services defined by Federal Communications Commission regulations includes the Family Radio Service (FRS) and General Mobile Radio Service (GMRS) which operate at 462 and 467 MHz, Multi-Use Radio Service (MURS) which operates at 150 MHz, the original Citizens Band Radio (CB) which operates at 27 MHz and more recently at 49 MHz, Wireless Medical Telemetry Service (WTMS) at 610, 1400 and 1430 MHz, the Low Power Radio Service (LPRS) at 216-217 MHz, and the Medical Implant Communications Service (MICS) at 402 MHz which are in some cases unlicensed, or easy to obtain a license for the Multi-Use Radio Service, or MURS, is a low power, short range, unlicensed personal radio service in the 150 MHz band. MURS is intended for short-range local voice or data communications. Antenna height is limited to 20 feet above structure or 60 feet above ground, whichever is the greater. Narrow bandwidth transmissions (maximum 11.25 kHz channel bandwidth, with +/−2.5 kHz deviation) intended for voice communications are permissible on all five MURS channels. The older +/−5 kHz deviation signals (with a maximum 20 kHz channel bandwidth) are also permitted (but not required) on the two upper channels (in the 154 MHz band). The range at maximum permitted transmit power of 2 watts is 2-8 miles.

A transceiver module may be provided which communicates with a smartphone, mobile computer or other computational device providing a human user interface or machine communication interface through a wired connection, such as USB or serial network (RS-232, RS-422, RS-423, RS-485, CAN (ISO 11898-1), J1850, FlexRay, IEEE-1905 (wireline), SPI, I$^2$C, UNI/O, and 1-Wire) or low power, short range wireless communication technology such as WiFi, Bluetooth, Zigbee or Insteon, Z-wave or the like. The transceiver module receives the data from the user interface device, and formats and retransmits the data, for example in the Multi Use Radio Service (MURS) at about 150 MHz with 500 mW transmit power, or likewise the interface device receives data from the transceiver device. The transceiver module may also receive all or a portion of the data from another transceiver module, store the received data and transmit a message comprising all or a portion of the data to another transceiver module. Of course, other technologies may be employed for the local communication with the user/machine interface device and the telecommunication with a remote system. Generally, the transceiver module is self-powered with an internal rechargeable or primary battery, fuel cell, energy harvesting generator/recharger, crank or kinetic generator, wireless induction, solar cell, power drawn from mobile phone's headphone audio jack, iOS Lightning port, supercapacitor, main line power (120 V plug), or USB power from a Smartphone (which can also provide a wired data connection. USB 2.0 provides limited power (5V, 500 mA), while USB 3.0 and 3.1 provide higher power limits (5V, 900 mA and 2100 mA).

Some nodes or supernodes in a mobile ad hoc network (MANET) may also have Internet access, and this may be used to unburden the first and second level MANET from the need to carry all administrative information. The administrative information, in that case, can be communicated directly between the nodes or supernodes that have direct Internet access, such as using a TCP/IP protocol, broadcast to all nodes or supernodes that have direct Internet access, such as using a UDP protocol, or uploaded to a central coordination server, which itself would maintain a global network state. In known manner, the underlying protocols may be proactive (OSLR, OSPF, etc.), reactive (AODV, DSR, etc.), hybrid, or other available types. In proactive routing, connectivity is discovered and known prior to computing routes to any destination in the network, for example, using link state routing such as Open Shortest Path First (OSPF), Intermediate-System-to-Intermediate-System (ISIS), or Optimized Link State Routing (OLSR). Reactive routing, on the other hand, discovers neighbors (in other words, it does not presume an a priori knowledge of network topology) and, in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc.

The information stored in the table or database typically includes an address of a node or supernode, its location, relative location, or network topological location, optionally a reliability indicator (Is this a fixed node? Mobile node? Intermittent node? Etc.), optionally a mobility vector, optionally a capability indication (node, supernode, Internet access, etc.), optionally a communication status (seeking to send communication, seeking to receive a communication, available to forward messages, temporarily or persistently unavailable, etc.), or other known type of pertinent information.

In a typical architecture, a transceiver device is associated with a WiFi router with DHCP server and network address translation, to support ad hoc networking over IEEE-802.11n or 11 ac of up to 255 nodes. The range of such communications is about 100 meters outdoors, but communications can hop through respective nodes to reach the controlling router. The transceiver communicates with the WiFi router over Bluetooth, WiFi, Ethernet (10/100 Mbit or 1 Gbit), USB 2.0, 3.0, 3.1, 4.0, or the like. Preferably, the WiFi router is situated to have available Internet access, though in some cases this is unavailable, and in other cases, the network is deployed because of a failure of cellular network and/or Internet access. The transceiver, in this case, communicates through the local server of the router and is not per se a node on the IP network established by the WiFi router. Therefore, the firmware of the router can be programmed to communicate through the transceiver according to an arbitrary protocol, e.g., the normal transceiver protocol. It is noted that instead of a WiFi router, a smartphone may be employed, in which the control software for the transceiver may be provided as an app rather than firmware.

The transceiver may also communicate though Bluetooth or the like with a node of the network, e.g., a smartphone, as an interface with the first level of the network. Bluetooth 3.0 Class 1 has a maximum range of 100 m, similar to WiFi. In cases where the transceiver is out of range of a node, it acts to maintain the routing table or database for the network by receiving communications from other transceivers, integrating the received information, and transmitting revised information to other transceivers. When a node of the MANET comes into range, the routing information from the node and transceiver are exchanged through Bluetooth or the like. In addition, the transceiver can provide reactive routing services for the node, and thus facilitate or optimize communications.

MANETs employ protocols which are burdened by transporting routing information between nodes. The problem is, for a communication in a dense network that requires 10+ hops, the amount of information that must be communicated to permit nodes of the network to understand the network architecture may exceed the data payload, and will involve burdensome communications with nodes uninvolved in the propose communication; meanwhile, a "proactive" protocol (which sends out routing information before communications are made) in such a network consumes much bandwidth even when there is no data to convey, while a reactive protocol (which requests network state information when a communication is to be sent) can be slow to respond and require a large volume of communications before the first data can be sent. In a mobile network, it may take so long to transport the location and status of nodes, that the information is stale by the time it reaches a destination. Meanwhile, an originating node typically does not commence a multihop transmission unless it knows of a path that will reach the destination, but seeks to wait until it identifies the best path to the destination.

The transceiver can solve these problems by providing long-range proactive communications for administrative and routing information that both unburdens the data communications channels and increases communications reliability. Because the communications are proactive, they can decrease network activity during periods of congestion. In times of emergency, the transceiver can also indicate where nodes need to be established in order to maintain a reliable and complete network. In this capacity, the transceiver does, to a small extent, store and forward received information, but typically any received data is merged with a local table which is then distributed to the network. Since the communications from the transceiver tends to be omnidirectional, one available strategy is for the transceiver to communicate its entire table, except expired, unreliable or irrelevant data. A corresponding receiver that receives the data then filters that data and integrates it into its own table. This out-of-band communication of administrative information benefits public safety by making infrastructure-less mesh networking a viable option in case of emergencies or in remote locations where alternate communication services are unreliable.

The transceiver can also forward messages while appending path information, which can include location information. Therefore, in case of emergency, even one occurring after the communication, one can determine nearest nodes to the source node. The present technology therefore improves the probability of getting an emergency message from one party to another.

A transceiver may store in a table a received signal strength indicator associated with a signal received from another transceiver, and this information is stored and distributed as part of the table. This information permits inferences of distance between transceivers, and by triangulation in a network of transceivers, a map may be estimated. Therefore, even with partial GPS location information, the routing table can provide relatively complete locations, facilitating use of a geographic routing protocol.

According to one embodiment, the transceiver device is capable of operating in unlicensed or minimally licensed bands, and in highly regulated bands, based on a software control. If a user wishes to make use of operation in a highly regulated band, a code may be provided to permit the user to subscribe to the band. The subscription typically requires a payment to a licensee for the band, which can be a periodic (recurring) payment, a payment based on data usage, a payment based on time usage, or the like. The subscription may be prospective or retrospective; that is, a user may acquire license rights, typically in the form of a cryptographic key that unlocks the features. The key may be communicated over the Internet, to the application running on the smartphone or computer, or through the control channel. The key may also simply be a code that is entered, either directly into the transceiver device or into the applet which controls/communicates with it. A hardware key, also known as a "dongle" may be used to provide the authorization. Similarly, other known methods of providing and enforcing a prospective subscription may be implemented, either in the applet or control software, or in the firmware of the transceiver device, or both. In the case of a retrospective (post-paid) subscription, the user is provided with an account, and typically, a "credit limit", such that protracted use of the services without paying is limited. The transceiver device, therefore, may have a secure non-volatile memory that monitors usage and required payments, which may be absolute or relative, e.g., tokens. The transceiver imposes a limit on the deficit or payment or tokens than can be accumulated, and will not operate in the highly regulated band after the limit is reached. Typically, the post-paid subscription is tightly coupled to a real time or near real-time accounting system. For example, in the highly regulated band, there may be a set of infrastructure base stations, with which most communications are conducted. Therefore, the base station can transact with the transceiver device immediately, to ensure compliance with the rules. As noted, the implementation may be in the firmware of a processor that controls the transceiver device, in an application program or applet that communicates with the transceiver device, within a dongle or specialized cable, or the like. Advantageously, if there is a highly regulated band available, the system may permit the control channel communications to occur on the highly regulated band, and charge premium fees for use of data channels within the highly regulated band, and otherwise permit free communications only on the "free" channels.

According to an embodiment, the transceiver devices operate within a proprietary band, i.e., a frequency band that is controlled by an entity and subject to use under terms and conditions imposed by that entity. In that case, there will generally be low interference on the operating frequencies, and perhaps more importantly, the protocol for operation of the transceiver devices may be engineered to follow a deterministic protocol, without significant consideration for non-cooperative devices operating on the same band. When operating in such a controlled band, cooperation and deference between transceiver devices may be enforced. In order to police usage of the band, the identification messages broadcast by each transceiver device may be filtered for authorization, either by a base station system, or by an authorization list/revocation list implemented by a distributed group of transceiver devices. If a transceiver device has an expired or invalid authorization or subscription, a base station may refuse to permit or facilitate operation, or broadcast a list of authorized/unauthorized transceiver devices which act as a filter for forwarding messages between transceiver devices in an ad hoc mode. The authorization may also be communicated through the Internet by way of smartphones or computers which interface with the transceiver devices.

According to one embodiment, a micropayment scheme is implemented to encourage users to permit usage of their transceiver devices as intermediate nodes in communications for other transceiver devices to use. Therefore, a transceiver device that uses another device may pay a small amount for that usage, which can then be used in the event that the transceiver device then needs to communicate on its own behalf. Likewise, use of the control channel and data channels may also be subject to monetary exchanges, which can be artificial currencies isolated from the real economy, or units of financial value. The rules for economic payments and compensation may differ for the various bands of operation, and a band licensee may receive payment according to the defined protocol. See, US Pub App. Nos. 2013/0080307; 2011/0004513; 2010/0317420; 2010/0235285; 2008/0262893; 2007/0087756; and 2006/0167784; expressly incorporated herein by reference. One issue for modern data communication is the availability of efficient encryption and decryption algorithms, which enable one to provide a significant degree of security and privacy for the communication. This was not available for the older analog voice communication, though in some cases an analog scrambling technology was employed which required special receivers, and in some cases, codes to decipher. Digital communication encryption is well known, however, providing private encrypted channels within a wireless ad hoc broadcast communication network with shared communication medium has unresolved issues, such as authentication of a new counterparty, and leakage of communication metadata over control channels.

The technology preferably provides a hardware and software bundle that can enable computers and mobile phones to communicate data packets with a relatively small data payload, without relying on the Internet or the central cellular network infrastructure. This may be referred to as user-to-user communications (U2U), point-to-point (P2P), vehicle to infrastructure (V2I) or vehicle to vehicle (V2V). Computers and mobile phones enable users to send much more than text messages. For example, GPS coordinates, multimedia from the situation, accelerometer and other sensor data can all be sent over a decentralized network, enabling enhanced communication and situation response when the central grid is unavailable.

The communication functions, including routing services as may be necessary, are preferably implemented by computer executable instructions executed by the microprocessor(s) to perform functions provided by one or more routing protocols, such as reactive routing protocols (and, e.g., may thus be referred to as "reactive routing services") as will be understood by those skilled in the art. These functions may be configured to manage a routing table/cache containing, e.g., data used to make routing decisions. In particular, as opposed to proactive routing, where connectivity is discovered and known prior to computing routes to any destination in the network (e.g., Optimized Link State Routing, "OLSR", see U.S. Pat. Nos. 7,027,409, 8,483,192 and 8,488,589, expressly incorporated herein by reference, Request for Comment (RFC) 3626 by the Internet Society Network working group), reactive routing (or ad-hoc routing) discovers neighbors (i.e., does not have an a priori knowledge of network topology), and in response to a needed route to a destination, sends a route request into the network to determine which neighboring node may be used to reach the desired destination. Illustrative reactive routing protocols may comprise, inter alia, Ad-hoc On-demand Distance Vector (AODV), Dynamic Source Routing (DSR), DYnamic MANET On-demand Routing (DYMO), etc. Generally, reactive routing protocols may be used to reduce storage and processing requirements on the nodes (e.g., small, distributed, low-power devices, such as sensors), and to limit the number of updates to stored topologies due to the adhoc changing nature of the network (e.g., MANETs).

For example, AODV is a reactive routing protocol (establishes a route to a destination only on demand) that is a distance-vector routing protocol (and uses sequence numbers on route updates to avoid various known problems with distance-vector protocols). In AODV, the network is silent until a connection is needed to transmit data packets to a destination, at which time the node requiring a connection broadcasts a request for connection (a route request, or "RREQ" message). Other nodes forward this request, recording the node from which the request was received, until the destination is reached, or until a node is reached that has a previously learned route to the destination. At that time, a reply (a route reply, or "RREP" message) is returned to the requesting source node backwards along the recorded route, and the requesting node (and any intermediate node) thus learns a route (i.e., the next hop node) to the destination, and stores this information (the next-hop node) in routing table. (Notably, a plurality of routes is often learned, and the requesting node is configured to select a "best" route, such as based on a hop count, cost, etc.). When a link in the network fails, a routing error is passed back to a transmitting node, and the process to learn a route to the destination repeats. Sequence numbers may be used to determine a most recently route, as ad-hoc networks tend to change topology often.

DSR, on the other hand, is another reactive routing protocol that is similar to AODV, however, DSR uses source routing instead of relying on the routing table at each intermediate device. A similar technique using route requests and replies are again used, but now the source node includes the entire path within data packets sent to the destination. In this manner, the intermediate nodes need not store (or update) information in routing tables. Note that each intermediate node may still cache the entire path to the destination (in routing cache), which may be used to reply to a route request quickly, as the intermediate node is aware (at least temporarily) of a path to the requested destination.

A multi-hop, ad-hoc wireless data communications network transmits a packet among different intermediate nodes using multiple hops as it traverses the network from a source node to a destination node. In a TDMA mesh network, the channel time slot can be allocated before the node data is transmitted. The channel transmit time is typically allocated in a recurring slot. The channel time typically is segmented into blocks as an epoch and blocks are divided into slots used by nodes to transmit data. If the data is an isochronous stream, the data can be repeatedly generated and presented at the source node for delivery to a destination node. The data is time dependent and is delivered by a specified time.

Other protocols include Open Shortest Path First (OSPF), Intermediate-System-to-Intermediate-System (ISIS), Temporally Ordered Routing Algorithm (TORA), Topology Dissemination Based on Reverse-Path Forwarding (TBRPF), Destination Sequenced Distance-Vector (DSDV) (see U.S. Pat. No. 5,412,654, expressly incorporated herein by reference), and Zone Routing Protocol (ZRP) (U.S. Pat. No. 6,304,556, expressly incorporated herein by reference), B.A.T.M.A.N. (Better Approach To Mobile Adhoc Networking), PWRP (Predictive Wireless Routing Protocol), OORP (OrderOne Routing Protocol), (OrderOne Networks Routing Protocol), HSLS (Hazy-Sighted Link State), and IWMP (Infrastructured Wireless Mesh Protocol) for Infrastructured Mesh Networks by UFPB-Brazil. See, U.S. Pat. Nos. 8,578,015, 8,576,831, expressly incorporated herein by reference.

On devices not capable or configured to store routing entries, the routing process may consist solely of providing mechanisms necessary for source routing techniques. That is, for source routing, other devices in the network can tell the less capable devices exactly where to send the packets, and the less capable devices simply forward the packets as directed. See, U.S. Pat. Nos. 8,630,177, 8,538,458, and 8,619,789, expressly incorporated herein by reference.

In addition, DYMO is a successor to AODV, which shares many of AODV's benefits, but which may be more efficient to implement. DYMO may be a proactive routing protocol and/or a reactive routing protocol. Similar to AODV (and DSR), DYMO discovers routes as they are needed through two steps: 1. A "Route Request" (RREQ) message is broadcast through the MANET. Each RREQ message maintains an ordered list of all nodes it has passed through, so every node receiving an RREQ message can record a route back to the origin of this message; and 2. When an RREQ message arrives at its destination (or a node aware of a route to the destination), a "Routing Reply" (RREP) message is returned back to the origin, indicating that a route to the destination was found. On its way back to the source, an RREP message can simply backtrack the path of the RREQ message and may allow all nodes through which it passes to record a complementary route back to where it came from. Once the RREP message reaches its destination (i.e., the requesting source node), a two-way route has been successfully recorded by all intermediate nodes, and the exchange of data packets (traffic) may begin.

In other words, regardless of the specific protocol used for reactive routing (AODV, DSR, DYMO), a similar technique may be used to obtain routes to a particular destination, whether that route is stored locally on the intermediate nodes or is transmitted with the data packet. Specifically, the use of general "route request" messages and "route reply" messages may be used, accordingly, to obtain the desired paths through the network.

See, U.S. Pat. Nos. 8,661,500, 8,661,144, 8,661,081, 8,660,139, 8,660,047, 8,655,395, 8,655,369, 8,654,782, 8,654,698, 8,578,054, 8,452,895, 8,441,994, 8,432,820, 8,427,957, 8,392,607, 8,374,165, 8,341,289, 8,335,207, 8,335,164, 8,255,469, 8,238,319, 8,223,710, 8,213,409, 8,203,990, 8,194,541, 8,144,619, 8,121,629, 8,059,578, 8,050,196, 8,041,377, 8,031,720, 8,014,329, 8,009,615, 7,996,558, 7,974,402, 7,969,914, 7,924,796, 7,890,112, 7,886,075, 7,814,322, 7,792,050, 7,742,399, 7,697,459, 7,656,851, 7,626,967, 7,616,961, 7,602,738, 7,590,589, 7,567,547, 7,453,864, 7,346,167, 7,330,694, 7,266,085, 7,251,238, 7,184,421, expressly incorporated herein by reference in their its entirety. See also, Request For Comments 3626: Optimized Link State Routing Protocol (OLSR); Request For Comments 3684: Topology Dissemination Based on Reverse-Path Forwarding (TBRPF); Request For Comments 3561: Ad hoc On-Demand Distance Vector (AODV) Routing; and Request For Comments 4728: The Dynamic Source Routing Protocol (DSR) for Mobile Ad Hoc Networks for IPv4.

In proactive routing, each node stores and updates routing information constantly. The routing tables can be updated based on perceived changes in the network topology.

Therefore, a new transmission can start immediately without a route discovery delay. However, the constant exchange of routing information adds overhead to the protocol. OLSR and TBRPF protocols use proactive routing. The overhead traffic of a proactive routing protocol increases as the mobility of the nodes increases, since the routing information needs to be updated in shorter intervals.

In reactive routing, when a node wishes to transmit, it starts a route discovery process in order to find a path to the receiver. The routes remain valid until the route is no longer needed. AODV and DSR protocols use reactive routing. In the AODV protocol, to find a route to a receiver, a terminal broadcasts a route request message containing the address of the receiver and the lifespan of the message. Terminals receiving the message add their address to the packet and forward it if the lifespan is not exhausted. If a receiver or a terminal knowing the route to the receiver receives the route request message, it sends a route reply back to the requester. If the sender does not receive a route reply before a timeout occurs, it sends another route request with a longer lifespan. The use of sequential route requests with incremental increases in timeout allows a mapping of the network by hop count. See, U.S. Pat. No. 8,600,830, expressly incorporated herein by reference.

A preferred frequency range for operation is in the VHF bands at about 150 MHz-175 MHz. However, the technology is not so limited. For example, the band usage may include 25-50 MHz; 72-76 MHz; 150-174 MHz; 216-220 MHz; 406-413 MHz; 421-430 MHz; 450-470 MHz; 470-512 MHz; 800 MHz; 806-821/851-866 MHz; 900 MHz (896-901/935-940 MHz), which may be used single or concurrently. In one embodiment, the same information is transmitted concurrently on multiple channels in multiple bands; in other cases, different information may be communicated in the different bands. Each band may have different federal licensing issues. Preferably, the processor has a database of the various restrictions, and implements these restrictions automatically. In some cases, this may require location information, and in such case, the transceiver device may comprise a GPS (global positioning system) receiver device. For example, in the "whitespace" vacated by prior incumbent analog television broadcasters, unlicensed use is subject to geographic restrictions. Use of these bands is subject to regulation in the US under parts 90, 91 and 95 of the FCC rules, 47 C.F.R., which are expressly incorporated herein by reference.

An embodiment of the technology provides a self-contained device having a local, short range wireless (e.g., Bluetooth or WiFi) or wired link (USB 2.0 or 3.0), which communicates a data stream, as well as high level control information, such as destination, mode (point-to-point communication, multicast, broadcast, emergency, etc.), and other information. The device typically includes a battery, for example to power the device even in event of an emergency. The device includes a long range (e.g., up to 8-20 miles), relatively low data rate transceiver and associated antenna and/or antenna coupler. A modem circuit is provided to convert a data stream into a modulated radio frequency signal, and to demodulate a received modulated radio frequency signal into a data stream. A processor is provided to create and receive the data stream, as well as provide low level control to the modem circuit and radio frequency transmitter, such as to autonomously communicate over a control channel, packetize the data to include identifying, routing and control headers. The device may also include one or more sensors, such as GPS, temperature, pressure, seismology (vibration), movement, etc. Typically, the device will have a simple user interface, such as an on-off switch, and micro-USB data/charging port.

The device uses a proprietary protocol for managing the band(s) and channel usage. Preferably, the protocol requires only a single concurrent radio channel, and thus a radio communicates over a common control channel until data communications are initiated, and then the radio switches to another channel in the band for data communications, and thereafter switches back to the control channel.

Thus, a preferred one of the channels in the band is used as a control channel. On this channel, each device listens for data packets that reference it, either individually or as part of a defined group, or in cases of multihop mesh network, packets which the respective node could forward. The device also maintains a table of all nodes in communication range and/or a full or partial history of prior contacts, based on a proactive (transmission of information before a need arises) and/or reactive (transmission of information on an as-needed basis) protocol. The device may broadcast transmit a packet periodically to other devices, to help establish their respective tables, or seek to establish a network at the time a communication is required. The system may conserve power by powering down for most of the time, and activating the radio functions in a predetermined and predictable window of time. For example, if GPS is provided, a common window of 1 millisecond per 10 seconds may be provided for signaling. (Though the GPS receiver may consume some amount of power). Other types of synchronization are possible, such as a broadcast time signal with micropower receiver. If a signal is present during a predetermined window, the radio remains on to listen for the entire message or set of messages. This permits a low duty cycle, and therefore reduced power consumption.

The processor within the device controls all communications on the control channel, and typically does so autonomously, without express control or intervention by the control signals received through the short-range communication link, e.g., from the smartphone app. If communications on the preferred control channel are subject to interference, a secondary control channel may be used. In some cases, a separate control channel or algorithm for switching to other control channels may be provided for each communication band.

In a traditional implementation, the control channel initially communicates a request to send (RTS) message. Routing information is communicated in response to the RTS, and thus the protocol acts in a responsive manner. A clear-to-send (CTS) response from a target is used to acknowledge the RTS. The receiver is preferably a hybrid system where the channel has both contention and non-contention periods. Non-contention periods are established once a RTS/CTS handshake is completed between the sending and receiving nodes, and the amount of time the medium will be busy is specified. During this period, there is no need for non-involved modules to actively monitor the channel. At the expiration of this time period, each user wanting to send a packet executes a back-off counter, such that the immediate contention for the channel once free is limited. Monitoring of the channel can occur beginning right after the expiration of the specified "busy period" of the RTS/CTS or sometime prior to the back-off counter decrementing to zero. Since the system operates without a centralized entity, a timeslot allocation protocol, if employed, must be decentralized. Because such decentralized coordination protocols may consume significant bandwidth on the control channel, they are disfavored. After a packet is successfully received, an acknowledgement (ACK) packet is sent, and/or after a corrupt packet is received, an Automatic Repeat reQuest (ARQ) is sent. Note that the RTS, CTS, ACK, and ARQ packets may include less information than that available within the packet by protocol; therefore, other information may piggyback on these packets. Each packet preferably uses a Reed Solomon cyclic redundancy check (CRC) to detect errors, though more complex error checking and error correction may be employed. A hybrid ARQ with retransmission and possibly incremental redundancy with soft combining may also be used. If operation is on multi-bands, then frequency-hopping and possibly some time-hopping may be employed, depending on the nature of the interference and the traffic. The forward error code (Reed Solomon CRC) will also provide some robustness to interference.

A collision sensing technology may also be provided, with random delay retransmit in case of collision, and a confirmation packet sent to confirm receipt. In such a scenario, predetermined timeslots would be disrupted, but in cases of interference, such presumption of regularity is violated in any case. In some cases, the confirmation packet may include an embedded response, such as routing information. The basic protocol may include not only error detection and correction encoding, but also redundant transmission, over time, especially when impaired channel conditions are detected. That is, the data communications and control channel communications may include an adaptive protocol which optimizes the throughput with respect to channel conditions, communications community, and/or network topology, and therefore adopt different strategies for balancing efficient channel usage and reliability. It is generally preferred that the control channel have a range and reliability in excess of normal communication channels, and thus may operate at a higher power, lower modulation rate (in order to provide a more robust signal), or with enhanced error detection and correction, and perhaps redundancy.

In some cases, such as in a densely populated region with multiple operative nodes, it may be desirable to limit (restrict) effective communication range and therefore have greater spatial channel reuse and reduced mutual interference. In such cases, the system may be operated using aggressive modulation schemes, such as 16-QAM, 64-QAM or 256-QAM, which would provide limited range and therefore higher spatial channel reuse. Another aspect of the technology is the effective use of a shared channel subject to interference by non-cooperate users as an automated digital communication command and control channel. In such an environment, each node of the network should listen to the channel for digital communications, analog (voice) communications, and various types of interference, before transmitting. In a network subject to competing non-cooperative use, it is often a better strategy to cease competing usage (back off) and permit the non-cooperative use to complete successfully, than to interfere with that usage while not successfully achieving efficient communications. In some cases, if competition for channel usage is significant and enduring, then an alternate control channel may be used instead of a preferred one. Further, by employing a predetermined and shared algorithm between devices, complex interference mitigation schemes, such as band-switching.

The communication device typically has electrically reprogrammable (flash) memory to store packets before transmission, received packets, address and targeting information, and firmware providing instructions including protocol definition for the automated processor in the communication device. Advantageously, all communication devices employ updated and consistent firmware, though custom devices may be provided. The app, as part of a smartphone environment, can download the latest firmware, and automatically update the communication device, so that all communication devices support interoperable protocols, and the number of versions of the protocol that need to be concurrently supported is limited. In some cases, there may be alternate firmware and associated protocols, which may be selected by a user according to need and environment. For example, a GPS derived location in the smartphone can inform the "app" which protocol is most appropriate for the operating environment (e.g., city, suburban, rural, mountain, ocean, lake, weather effects, emergency conditions, user density, etc.). In order to limit the required storage for various protocols within the communication device, these may be loaded as needed from the smartphone.

The communication device may be part of, or linked to, the "Internet of Things" (IoT). Typically, in an IoT implementation, the goal is to provide communications for automated devices. According to one embodiment, the communication device may be the same hardware as described in prior embodiments. However, in that case, the firmware may provide a different communication protocol and other aspects of operation, and instead of a smartphone-type control device, the data source or sink may or may not have a human user interface, and typically controls the data communications in an autonomous manner. The system may incorporate energy harvesting, especially when transmissions are bursty with low duty cycle, i.e., less than 0.1%, with a 2 watt output (average 2 mW).

The IoT control device or smartphone can, in addition to communicating data and address information, can also manage power (read battery level, control transmission power, manage duty cycles and listening periods, etc.). Based on estimated power remaining and predicted charging cycles, the system can optimize consumption and usage to achieve continuous operation. The control device can also warn the user through the user interface when a recharge cycle is required.

The device may include a computer-readable storage medium (or more specifically a non-transitory computer-readable storage medium) on which is stored one or more sets of instructions (e.g., instructions executed by private point-to-point communication between computing devices) for the computer system representing any one or more of the methodologies or functions described herein. The instructions for the computer system may also reside, completely or at least partially, within the main memory and/or within the processing device during execution thereof by the computer system, the main memory and the processing device also constituting computer-readable storage media. The instructions for the computer system may further be transmitted or received over a network via the network interface device.

While the computer-readable storage medium is shown in an example to be a single medium, the term "computer-readable storage medium" should be taken to include a single-medium or multiple-media (e.g., a centralized or distributed database, and/or associated caches and servers) that store the one or more sets of instructions. The term "computer-readable storage medium" shall also be taken to include any medium that is capable of storing or encoding a set of instructions for execution by the machine that cause the machine to perform any one or more of the methodologies of the disclosure. The term "computer-readable storage medium" shall accordingly be taken to include, but not be limited to, solid-state memories, and optical and magnetic media.

Some portions of the detailed descriptions above are presented in terms of symbolic representations of operations on data bits within a computer memory. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "configuring," "associating," "executing," "adjusting," "sending," "receiving," "determining," "transmitting," "identifying," "specifying," "granting," "accessing," "assigning," "detecting," and "requesting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may be a general-purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The descriptions and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

SUMMARY OF THE INVENTION

In a multi-hop wireless network (also known as a "mesh network" or "ad hoc network"), there is often a limitation in message-carrying capacity. When the number of messages that needs to be sent in the network exceeds the message-carrying capacity, a specific node under such overload conditions is forced to drop one or more messages, or excessively delay the message. This causes a deterioration in the packet delivery ratio. Under overload, it is preferable that the message sources be informed of this congestion so that they can throttle back their message generation, if possible. Although this concept has had manifestations in wireline networks ("Explicit Congestion Notification" bit), it has not seen general application in multi-hop wireless mesh networks.

The present technology implements this scheme through three main components:

(1) a mechanism at the Medium Access Control (MAC) layer for determining when a given source or transit node is deemed congested, (2) a mechanism at the Network Layer (NL) determining how to propagate this information to applications, including suitably combining overload indications received from neighbors, and (3) a mechanism at the Transport Layer (TL) of each source of traffic for determining when a source is generating excessive traffic, and combining it with Medium Access Control (MAC)-based overload indication from downstream nodes.

The multi-layer approach to traffic throttling is an important aspect of the method.

It is an object to provide a method for managing congestion in a multi-hop wireless network comprising a plurality of communication devices, comprising: determining at a Medium Access Control (MAC) layer of a respective communication device a congestion parameter; receiving congestion parameters from neighboring communication devices through the Medium Access (MAC) layer; and determining at a Transport Layer (TL) that a respective source of traffic is generating excessive traffic, and dependent on the propagated information, modulating the traffic from the source, to thereby regulate traffic in the multi-hop wireless network. A corresponding apparatus, and computer readable medium storing non-transitory instructions for controlling a programmable processor to perform the method, is also provided.

The method may further comprise propagating information, at a Network Layer (NL), dependent on the determined congestion parameter and received congestion parameters to applications associated with sources of traffic. The method may further comprise throttling traffic from at least one application dependent propagated information.

The Medium Access Control (MAC) layer may determine the congestion parameter based on at least a Transmit Overhead Utilization (TOU) parameter and a Received/Transmit Utilization (RTU) parameter. The Medium Access Control (MAC) Layer may employ a Carrier Sense Multiple Access (CSMA) protocol. After sensing a transmission carrier of a neighbor communication device, and prior to transmission of a packet, the communication device may implement a waiting time. The waiting time may be dependent on a forced jitter time and/or a backoff time.

The Medium Access Control (MAC) layer may measure a Transmit Overhead Utilization (TOU) comprising a time used for message transmission, comprising the forced jitter time and the backoff time used prior to transmission, accumulated over a time window period.

The Transmit Utilization Overhead (TOU) may be expressed as a ratio of time used for message transmission over the time window period, $$TOU(t)=(T(t-w,t)+J(t-w,t)+B(t-w,t))/w$$

where:

t is the current time, w is the number of seconds in the past that is being considered (the window period), $T=T(t_1, t_2)$ is the total amount of time spent transmitting between times $t_1$ and $t_2$, $J=J(t_1, t_2)$ is the total amount of time spent in jitter between times $t_1$ and $t_2$, and $B=B(t_1, t_2)$ is the total amount of time spent in backoff between times $t_1$ and $t_2$.

The Medium Access Control (MAC) layer may also measure a Received/Transmit Utilization (RTU) comprising a time used for message reception. The Receive/Transmit Utilization (RTU) may be is expressed as a ratio of the time used for message reception over a window period, $$RTU(t)=(T(t-w,t)+R(t-w,t))/w$$

where:

t is the current time, w is the window period, $T(t_1, t_2)$ is the total amount of time spent transmitting between times $t_1$ and $t_2$, and $R=R(t_1, t_2)$ is the total amount of time spent in active receive between times $t_1$ and $t_2$.

TOU and RTU may be a function on T, R, J, B, for f and g:

$$TOU(t)=f(T(t,t-w)+J(t,t-w)+B(t,t-w),w);$$

$$RTU(t)=g(T(t,t-w)+J(t,t-w)+B(t,t-w),w)$$

where:

t is the current time, w is the number of seconds in the past that is being considered (the window period), $T=T(t_1, t_2)$ is the total amount of time spent transmitting between times $t_1$ and $t_2$, $J=J(t_1, t_2)$ is the total amount of time spent in jitter between times $t_1$ and $t_2$, $B=B(t_1, t_2)$ is the total amount of time spent in backoff between times $t_1$ and $t_2$, and.

$R=R(t_1, t_2)$ is the total amount of time spent in active receive between times $t_1$ and $t_2$.

w may be, for example, 60 seconds.

Each of the Transmit Utilization Overhead (TOU) and the Receive/Transmit Utilization (RTU) may have a threshold, which may be implemented in a history-dependent manner or with applied hysteresis.

The Medium Access Control (MAC) layer may determine the congestion parameter depending on a self-overload status, which indicates self-overload if and only if the Transmit Utilization Overhead (TOU) is above threshold with hysteresis or the Receive/Transmit Utilization (RTU) is above threshold with hysteresis. The Medium Access Control (MAC) layer may indicate no self-overload if and only if the Transmit Utilization Overhead (TOU) is below threshold with hysteresis and the Receive/Transmit Utilization (RTU) is below threshold with hysteresis. The self-overload status may remain at a prior state unless one of Transmit Utilization Overhead (TOU) and Receive/Transmit Utilization (RTU) are above threshold with hysteresis or both Transmit Utilization Overhead (TOU) and Receive/Transmit Utilization (RTU) are below threshold with hysteresis.

The Medium Access Control (MAC) layer may determine the congestion parameters as a self-overload status dependent on the Transmit Overhead Utilization (TOU) parameter and the Received/Transmit Utilization (RTU) parameter. The self-overload status may be forwarded to the Transport Layer (TL). The Medium Access Control (MAC) layer may communicate the self-overload status to the neighbor communication devices.

The Medium Access Control (MAC) layer may receive the congestion parameters of the neighboring communication devices as a respective self-overload status of a respective neighboring communication device dependent on the respective Transmit Overhead Utilization (TOU) parameter and the Received/Transmit Utilization (RTU) parameter of the neighboring communication device. The Medium Access Control (MAC) layer may communicate the self-overload status to neighbor communication devices. The method may further comprise maintaining a neighbor-overload status dependent on whether any neighbor communication devices indicate a self-overload status. The neighbor-overload status may be cleared if not self-overload status is received from any neighbor communication device within a timeout period. The timeout period may be, e.g., 10 seconds.

The method may further comprise maintaining a net-overload status comprising self-overload status OR neighbor-overload status. An alert may be communicated to the Transport Layer (TL) when the net-overload status changes. The method may further comprise setting a TL-overload status to overload if net-overload status is overload and a rate the Transport Layer (TL) is sending packets is in excess of a threshold rate. The method may further comprise limiting the rate the Transport Layer (TL) is sending packets to the threshold rate if the TL-overload status is overload. The threshold rate may be, e.g., one packet per 10 seconds.

The method may further comprise propagating, at a Network Layer (NL), the TL-overload status to applications associated with sources of traffic. The method may further comprise throttling traffic from at least one application dependent on the TL-overload status.

It is also an object to provide a method for managing congestion in a multi-hop wireless network comprising a plurality of communication devices communicating packets through a communication medium, comprising: determining a self-congestion parameter at a Medium Access Control (MAC) layer of a respective communication device representing congestion in the multi-hop wireless network; receiving a neighbor congestion parameter from a neighbor communication device of the multi-hop wireless network; propagating information comprising the determined self-congestion parameter of the respective communication device and neighbor congestion parameter from the neighbor communication device through the Medium Access Control (MAC) layer of the respective communication device to the communication medium of the multi-hop wireless network; determining, dependent on the propagated information comprising the neighbor congestion parameter, at a Transport Layer (TL) of the respective communication device, that the respective communication device in the multi-hop wireless network is generating excessive traffic of packets in the communication medium of the multi-hop wireless network, according to at least one criterion; and modulating a flow of packets in the communication medium of the multi-hop wireless network from the respective communication device, dependent on the determining of the excessive traffic of packets, to thereby regulate traffic in the multi-hop wireless network.

The Medium Access Control (MAC) layer may determine the self-congestion parameter based on at least a Transmit Overhead Utilization (TOU) parameter and a Received/Transmit Utilization (RTU) parameter. The Medium Access Control (MAC) layer may employ a Carrier Sense Multiple Access (CSMA) protocol. After sensing of a transmission carrier of the neighbor communication device, and prior to transmission of a packet through the communication medium, the communication device has a waiting time. The waiting time may be dependent on a forced jitter time and a backoff time. The Medium Access Control (MAC) layer may measure a Transmit Overhead Utilization (TOU) comprising a time used for transmission of a message comprising at least one packet, the jitter time, and the backoff time used prior to transmission of the message comprising at least one packet, accumulated over a time window period. The Transmit Overhead Utilization (TOU) may be expressed as a ratio of time used for transmission of the message over the time window period, and the Transmit Overhead Utilization (TOU) determined based on: $TOU(t)=(T(t-w, t)+J(t-w, t)+B(t-w, t))/w$, where: t is the current time, w is the number of seconds in the past that is being considered (the window period), $T=T(t_1, t_2)$ is the total amount of time spent transmitting between times $t_1$ and $t_2$, $J=J(t_1, t_2)$ is the total amount of time spent in jitter between times $t_1$ and $t_2$, and $B=B(t_1, t_2)$ is the total amount of time spent in backoff between times $t_1$ and $t_2$.

The Medium Access Control (MAC) layer may measure a Received/Transmit Utilization (RTU) comprising a time used for reception of a message comprising at least one packet, expressed as a ratio of the time used for reception of a message comprising at least one packet over a window period. The Received/Transmit Utilization (RTU) may be determined based on: $RTU(t)=(T(t-w, t)+R(t-w, t))/w$, where: t is the current time, w is the window period, $T(t_1, t_2)$ is the total amount of time spent transmitting between times $t_1$ and $t_2$, and $R=R(t_1, t_2)$ is the total amount of time spent in active receive between times $t_1$ and $t_2$.

The Transmit Overhead Utilization (TOU) and the Receive/Transmit Utilization (RTU) may be a function on T, R, J, B, for f and g:

$$TOU(t)=f(T(t,t-w)+J(t,t-w)+B(t,t-w),w);$$

$$RTU(t)=g(T(t,t-w)+J(t,t-w)+B(t,t-w),w)$$

where: t is the current time, w is the number of seconds in the past that is being considered (the window period), $T=T(t_1, t_2)$ is the total amount of time spent transmitting between times $t_1$ and $t_2$, $J=J(t_1, t_2)$ is the total amount of time spent in jitter between times $t_1$ and $t_2$, $B=B(t_1, t_2)$ is the total amount of time spent in backoff between times $t_1$ and $t_2$, and $R=R(t_1, t_2)$ is the total amount of time spent in active receive between times $t_1$ and $t_2$.

Each of the Transmit Overhead Utilization (TOU) and the Receive/Transmit Utilization (RTU) may have a congestion-determination threshold. The Transmit Overhead Utilization (TOU) threshold and the Receive/Transmit Utilization (RTU) threshold may each be history-dependent. The Transmit Overhead Utilization (TOU) threshold and Receive/Transmit Utilization (RTU) threshold may each be applied with hysteresis.

The Medium Access Control (MAC) layer may determine the self-congestion parameter of the respective communication device depending on a self-overload status, which indicates a self-overload if and only if the Transmit Utilization Overhead (TOU) is above a hysteresis-dependent threshold or the Receive/Transmit Utilization (RTU) is above a hysteresis-dependent threshold.

The Medium Access Control (MAC) layer may indicate no self-overload if and only if the Transmit Utilization Overhead (TOU) is below a hysteresis-dependent threshold and the Receive/Transmit Utilization (RTU) is below a hysteresis-dependent threshold. The self-overload status may remain at a prior state unless either of the Transmit Utilization Overhead (TOU) and Receive/Transmit Utilization (RTU) are above the hysteresis-dependent threshold or both Transmit Utilization Overhead (TOU) and Receive/Transmit Utilization (RTU) are below the hysteresis-dependent threshold.

The Medium Access Control (MAC) layer may determine the self-congestion parameter as a self-overload status of the respective communication device dependent on the Transmit Overhead Utilization (TOU) parameter and the Received/Transmit Utilization (RTU) parameter, and the self-overload status forwarded by the Medium Access Control (MAC) layer to the Transport Layer (TL). The Medium Access Control (MAC) layer may receive the neighbor congestion parameter of the neighbor communication device as a respective self-overload status of the neighbor communication device dependent on a respective Transmit Overhead Utilization (TOU) parameter and a Received/Transmit Utilization (RTU) parameter of the neighbor communication device. The method may further comprise maintaining a neighbor-overload status dependent on whether any neighbor communication device indicates a self-overload status, wherein the neighbor-overload status is cleared if no self-overload status is received from any neighbor communication device within a timeout period.

The method may further comprise maintaining a net-overload status comprising self-overload status OR neighbor-overload status, further comprising: communicating an alert from the Medium Access Control (MAC) layer of the respective communication device to the Transport Layer (TL) of the respective communication device when the net-overload status changes; setting a TL-overload status to overload if net-overload status is overload and a rate the Transport Layer (TL) is sending packets is in excess of a threshold rate; and limiting a rate at which the Transport Layer (TL) sends packets to the threshold rate if the TL-overload status is overload. The method may further comprise propagating the TL-overload status, at a Network Layer (NL) of the respective communication device to the multi-hop wireless network, to an application executing on the other communication device in the multi-hop wireless network associated with generating the excessive traffic of packets; and throttling traffic from the application dependent on the TL-overload status.

It is a further object to provide a non-transitory computer readable medium for controlling a programmable automated device to manage congestion in a node of a multi-hop wireless network comprising a plurality of communication devices communicating packets through a communication medium, comprising: instructions for determining a self-congestion parameter at a Medium Access Control (MAC) layer of a respective communication device representing congestion in the multi-hop wireless network; instructions for receiving a neighbor congestion parameter from a neighbor communication device of the multi-hop wireless network; instructions for propagating information comprising the determined self-congestion parameter of the respective communication device and neighbor congestion parameter from the neighbor communication device through the Medium Access Control (MAC) layer of the respective communication device to the communication medium of the multi-hop wireless network; instructions for determining, dependent on the propagated information comprising the neighbor congestion parameter, at a Transport Layer (TL) of the respective communication device, that the respective communication device in the multi-hop wireless network is generating excessive traffic of packets in the communication medium of the multi-hop wireless network, according to at least one criterion; and instructions for modulating a flow of packets in the communication medium of the multi-hop wireless network from the respective communication device, dependent on the determining of the excessive traffic of packets, to thereby regulate traffic in the multi-hop wireless network.

It is another object to provide a node of a multi-hop wireless network, the multi-hop wireless network comprising a plurality of communication devices communicating packets through a communication medium, the node comprising: a transceiver configured to communicate through the communication medium, under control of a Medium Access Control (MAC) layer and a Transport Layer (TL); and an automated controller which controls the Medium Access Control (MAC) layer, and the Transport Layer (TL), the automated controller being configured to: determine a self-congestion parameter at the Medium Access Control (MAC) layer of the node representing congestion in the multi-hop wireless network; receive a neighbor congestion parameter from a neighbor communication device of the multi-hop wireless network through the transceiver; propagate information comprising the determined self-congestion parameter of the node and neighbor congestion parameter from the neighbor communication device through the Medium Access Control (MAC) layer through the transceiver to the communication medium of the multi-hop wireless network; determine, dependent on the propagated information comprising the neighbor congestion parameter, at the Transport Layer (TL) of the node, that the respective communication device in the multi-hop wireless network is generating excessive traffic of packets in the communication medium of the multi-hop wireless network, according to at least one criterion; and modulate a flow of packets in the communication medium of the multi-hop wireless network from the node, dependent on the determining of the excessive traffic of packets, to thereby regulate traffic in the multi-hop wireless network.

DETAILED DESCRIPTION OF THE PREFERRED EMBODIMENTS

MAC Layer: Overload Detection

Figure 1:
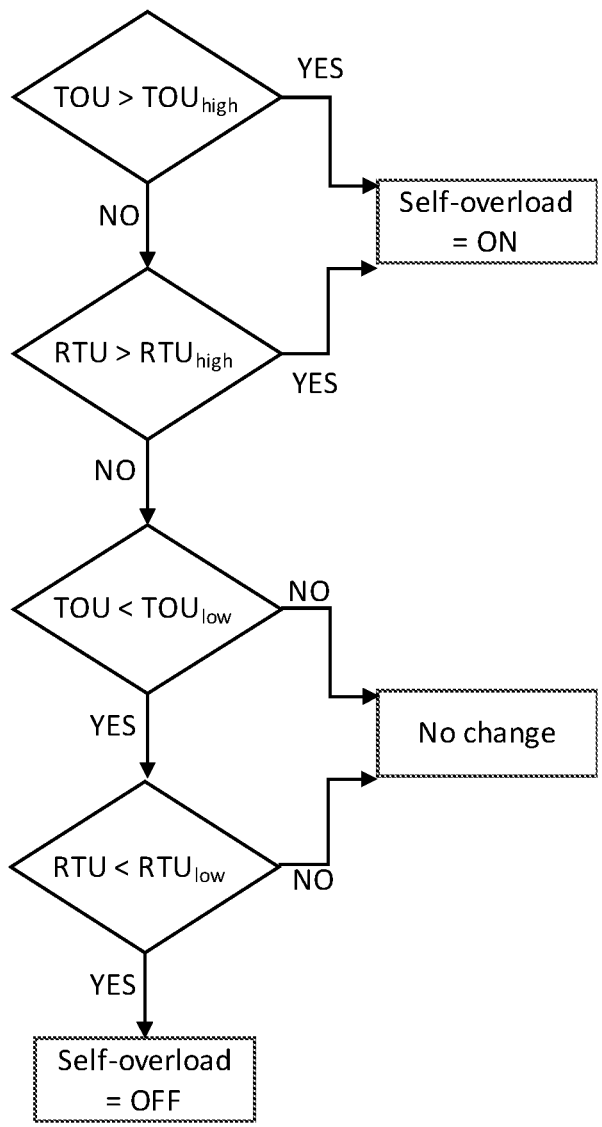
FIG. 1 shows a flowchart of logic behind computation of a self-overload status of a device in an ad hoc network.

The overload status at the Media Access Control (MAC) layer is measured via the Transmit Overhead Utilization (TOU) and the Received/Transmit Utilization (RTU).

The Medium Access Control (MAC) Layer employs a Carrier Sense Multiple Access (CSMA) approach. Prior to transmission, there are two kinds of forced waiting times when a node that has a packet to send is nonetheless prohibited from sending in order to minimize chances of packet collisions. The first is a forced jitter before transmitting a packet which happens before the channel is sensed. The second is a backoff which is activated when a node senses the channel busy.

The Transmit Overhead Utilization (TOU) consists of the time used by the message on the radio frequency transmission, including the jitter and the backoff used prior to transmission, accumulated over a window period. It is expressed as the ratio of the utilization time over a window period. Specifically, $$TOU(t)=(T(t-w,t)+J(t-w,t)+B(t-w,t))/w$$

where:
t is the current time,
w is the number of seconds in the past that is being considered (the window period),
$T=T(t_1, t_2)$ is the total amount of time spent transmitting between times $t_1$ and $t_2$,
$J=J(t_1, t_2)$ is the total amount of time spent in jitter between times $t_1$ and $t_2$, and
$B=B(t_1, t_2)$ is the total amount of time spent in backoff between times $t_1$ and $t_2$.

The Received/Transmit Utilization (RTU) consists of the time used by the received message (as soon as detected) on the RF air and the time used by the transmit message on the RF air. It is expressed as the ratio of the utilization time over the window period. Specifically, $$RTU(t)=(T(t-w,t)+R(t-w,t))/w$$

where:
t is the current time,
w is the window period, $T(t_1, t_2)$ is the total amount of time spent transmitting between times $t_1$ and $t_2$, and
$R=R(t_1, t_2)$ is the total amount of time spent in active receive between times $t_1$ and $t_2$.

Although the above describes a specific function for computing Transmit Utilization Overhead (TOU) and Receive/Transmit Utilization (RTU), any function on T, R, J, B can be used. That is, in general, Transmit Utilization Overhead (TOU) and Receive/Transmit Utilization (RTU) are as follows, for some embodiment off and g.

$$TOU(t)=f(T(t,t-w)+J(t,t-w)+B(t,t-w),w);$$

$$RTU(t)=g(T(t,t-w)+J(t,t-w)+B(t,t-w),w)$$

For example, f might give a higher weight to transmission time T than jitter J and backoff B.

The window w is a configured parameter. For example, w may be 60 seconds.

The overload flag of a given device, referenced as self-overload, is set to ON or OFF depending on the values of TOU and RTU measured above. In order to minimize oscillations, a "high water mark" and "low water mark" is used, e.g., hysteresis. The flag is set to ON when the TOU reaches more than $TOU_{high}$ or the RTU reaches more than $RTU_{high}$. It is set to OFF when the TOU reaches less than $TOU_{low}$ and the RTU reaches less than $RTU_{low}$.

The values of $TOU_{high}$, $TOU_{low}$, $RTU_{high}$ and $RTU_{low}$ are the high and low water marks for TOU and RTU, and are configurable. In an example implementation, they are set at 0.6, 0.5, 0.4 and 0.3 respectively.

FIG. 1 shows the logic behind the computation of the self-overload status of a device. First the current values of TOU and RTU are compared with the configured "high water marks" as follows. The current value of TOU is compared with the configured value of $TOU_{high}$. If TOU exceeds $TOU_{high}$, then the device Medium Access Control (MAC) declares its self-overload status as ON. If instead the TOU is less than or equal to $TOU_{high}$, then the device proceeds to compare the current value of RTU with the configured value of $RTU_{high}$. If RTU exceeds $RTU_{high}$, then the device once again declares its self-overload status as ON. If instead RTU is less than or equal to $RTU_{high}$, then TOU and RTU are compared with the configured "low water marks" as follows.

The current value of TOU is compared with the configured value of $TOU_{low}$. If TOU is less than $TOU_{low}$, then the device Medium Access Control (MAC) does not affect any change in its self-overload status. If instead the TOU is greater than or equal to $TOU_{high}$, then the device proceeds to compare the current value of RTU with the configured value of $RTU_{low}$. If RTU is less than $RTU_{low}$, then the device does not affect any change in its status. If instead, the RTU is greater than or equal to $RTU_{low}$, then it declares its self-overload status as OFF.

Network Layer: Overload Dissemination

All transmitted packets contain an overload status field that indicates whether or not the sender of the packet is overloaded. A node sets the overload status field to ON if its self-overload status is ON, else it sets it to OFF.

The self-overload status, ON or OFF, of a device is also forwarded to the Transport Layer (TL) of the device.

Devices also maintain a neighbor-overload status to track if any of its neighbors are overloaded. When a device receives a packet with the overload status field ON, it sets its neighbor-overload to ON. The neighbor-overload status returns to OFF after OVERLOAD_STATUS_EXPIRY consecutive seconds without receiving any packet with overload status ON from any of its neighbors. An example value of OVERLOAD_STATUS_EXPIRY is 10 seconds.

A device combines its self-overload status with its neighbor-overload status to create a NET-overload status as follows. If the self-overload status is ON or the neighbor-overload status is ON, the NET-overload status is set to ON, otherwise it is set to OFF. In terms of Boolean operations, NET-overload=self-overload OR neighbor-overload Whenever the NET-overload status toggles from ON to OFF or OFF to ON, an alert is sent to the Transport Layer, along with the NET-overload status.

Transport Layer: Throttling

The Transport Layer (TL) receives an alert from the Network Layer. The Transport Layer (TL) uses its own flag called TL-overload which is OFF by default. If the NET-overload status it receives is ON, and it is currently sending more than one packet every TL_PACING seconds on average, then it sets the TL-overload status to ON.

Whenever TL-overload is on, the device regulates the number of packets it sends such that no more than one packet every TL_PACING seconds is sent. For example, a value of 10 seconds may be used for TL_PACING.

Whenever the TL-overload status changes from OFF to ON, an optional indication is sent to any applications that are running over it (in many systems, this is done by having a "socket interface" or equivalent thereof), so that they can choose to alert the user (human or machine) to slow down sending. Similarly, when the TL-overload status changes from ON to OFF, an optional indication is sent. The mechanism for such indication may vary depending upon the context. The user and/or the application may or may not choose to slow down. Either way the Transport Layer (TL) regulates the packet sending the NL as mentioned above.

Figure 2:
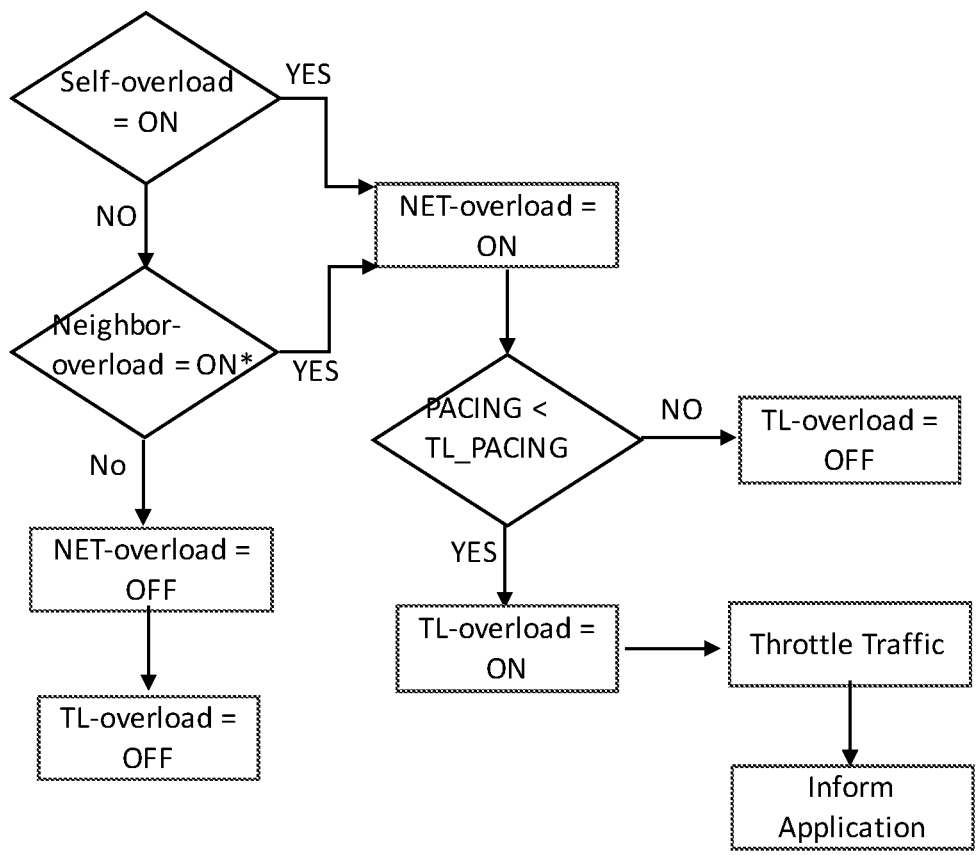
FIG. 2 shows a flowchart of logic behind computation of NET-overload, TL-overload and throttling, based on the self-overload determined according to FIG. 1.

FIG. 2 shows the logic behind the computation of NET-overload, TL-overload and throttling. To begin, the computational logic first observes the current value of self-overload as determined by the flowchart shown in FIG. 1. If the self-overload is ON, then the device automatically sets its net-overload to be ON. If instead the self-overload is OFF, then the device checks if its neighbor-overload is ON, and if and only if this is the case, the net-overload is set to ON, otherwise setting the net-overload as well as the TL-overload to OFF.

If the net-overload is set to ON, the method further determines whether to throttle traffic, or not, as follows. The device first checks if the current measured value of the PACING (average time interval between consecutive packets) is less than the configured value TL_PACING. If so, the TL-overload is set to ON. It then further proceeds to delay packets such that the PACING is higher than the TL_PACING. It also sends a message to the application to inform it of the TL-overload status. Applications may choose to reduce their sending rate accordingly.

Figure 3:
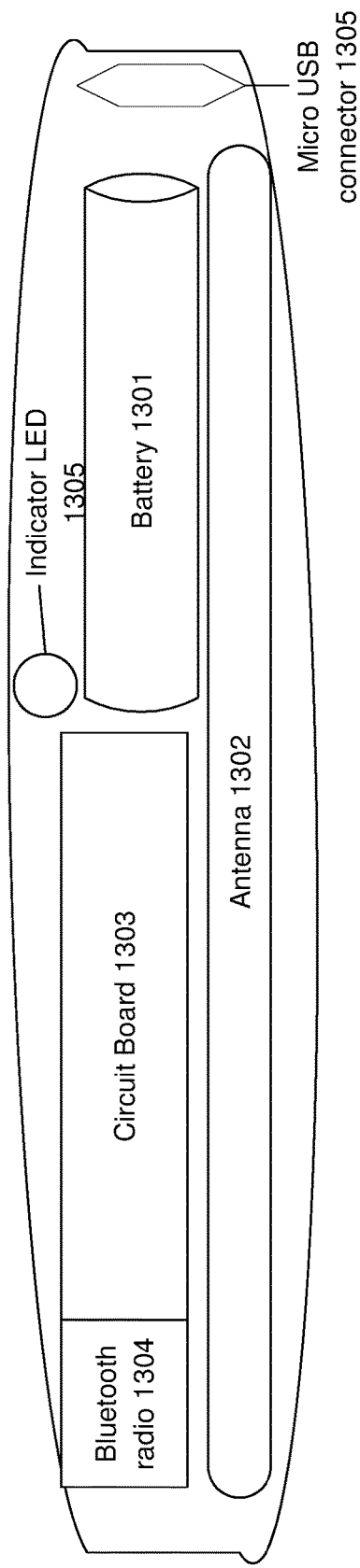
FIG. 3 shows a schematic diagram of a prior art communication device.

FIG. 3 shows an example physical layout of an embodiment of the communication device technology known as a goTenna®. Note that added hardware and features may be added as desired, but an advantage of the technology is that the design itself can remain simple. A battery 1301 is provided to power the system. This may be, for example, 1350 mAH lithium ion battery, or a standard type 1350 mAH cylindrical cell. A micro USB connector (e.g., USB 2.0) is provided for charging and communications. The device has a circuit board or boards 1303 which hold the processor, memory and radio, for example. A Bluetooth radio 1304 is provided for wireless communication with a smartphone. The MURS, GPRS, or other type radio transceiver broadcasts and receives through the antenna 1302, which may be internal, or provided externally through an SMA connector.

Figure 4:
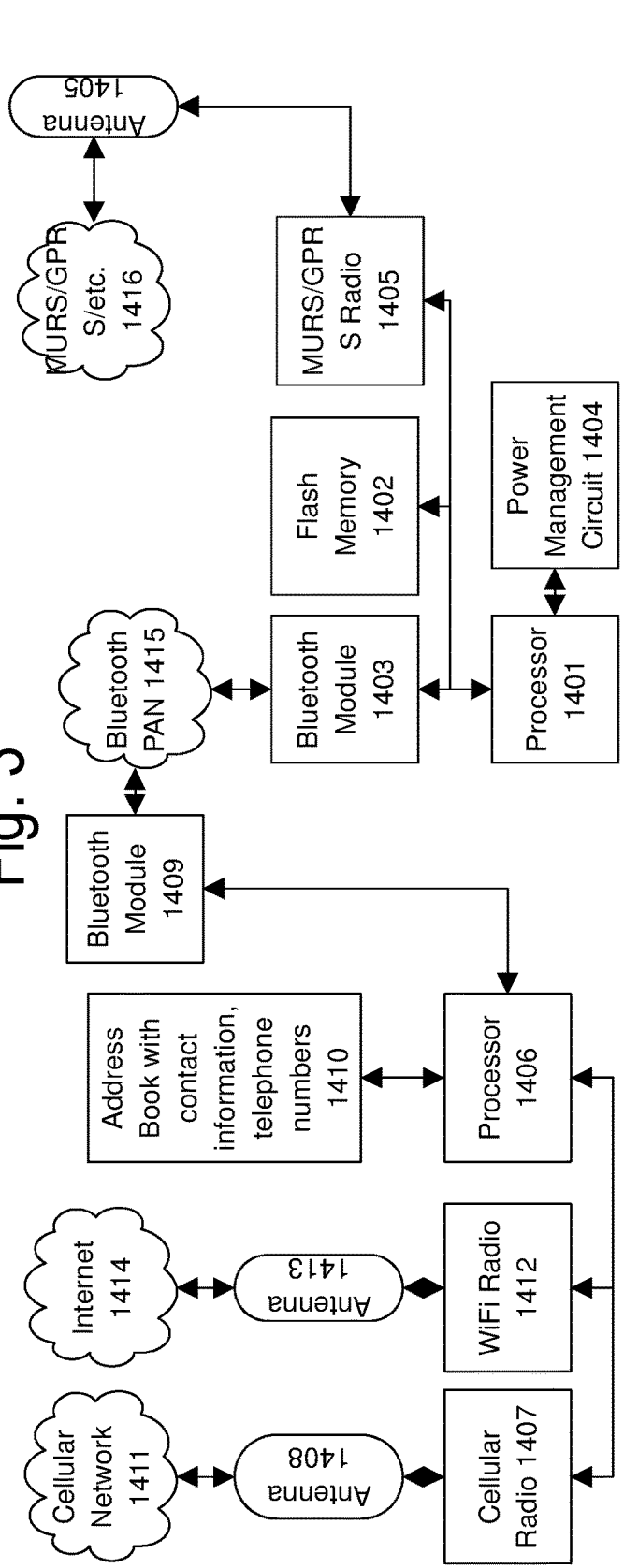
FIG. 4 shows a schematic diagram of a prior art telephony device and the prior art communication device according to FIG. 3.

FIG. 4 schematically shows the hardware architecture in more detail. The smartphone, of typical design, has a processor 1406, WiFi radio 1412, Cellular radio 1407, Bluetooth module 1409 (which may be integrated with other components), and an address book 1410. The WiFi radio 1412 communicates though antenna 1413 with a wireless local area network, and can ultimately reach the Internet 1414. The Cellular radio 1407 communicates though antenna 1408 with a cellular network 1411, which can also ultimately reach the Internet 1414.

It is to be understood that the above description is intended to be illustrative, and not restrictive. Many other examples will be apparent to those of skill in the art upon reading and understanding the above description. Although the disclosure has been described with reference to specific examples, it will be recognized that the disclosure is not limited to the examples described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method for managing congestion in a multi-hop wireless network comprising a plurality of communication devices communicating packets through a communication medium, comprising:
   determining a self-congestion parameter at a Medium Access Control (MAC) layer of a respective communication device representing congestion in the multi-hop wireless network;
   receiving a neighbor congestion parameter from a neighbor communication device of the multi-hop wireless network;
   propagating information comprising the determined self-congestion parameter of the respective communication device and neighbor congestion parameter from the neighbor communication device through the Medium Access Control (MAC) layer of the respective communication device to the communication medium of the multi-hop wireless network;
   determining, dependent on the propagated information comprising the neighbor congestion parameter, at a Transport Layer (TL) of the respective communication device, that the respective communication device in the multi-hop wireless network is generating excessive traffic of packets in the communication medium of the multi-hop wireless network, according to at least one criterion; and
   modulating a flow of packets in the communication medium of the multi-hop wireless network from the respective communication device, dependent on the determining of the excessive traffic of packets,
   to thereby regulate traffic in the multi-hop wireless network.

2. The method according to claim 1, wherein the Medium Access Control (MAC) layer determines the self-congestion parameter based on at least a Transmit Overhead Utilization (TOU) parameter and a Received/Transmit Utilization (RTU) parameter.

3. The method according to claim 2, wherein the Medium Access Control (MAC) layer employs a Carrier Sense Multiple Access (CSMA) protocol, and imposing a waiting time after sensing of a transmission carrier of the neighbor communication device, and prior to transmission of a packet through the communication medium.

4. The method according to claim 3, wherein the waiting time is dependent on a forced jitter time and a backoff time.

5. The method according to claim 4, wherein the Medium Access Control (MAC) layer measures a Transmit Overhead Utilization (TOU) comprising a time used for transmission of a message comprising at least one packet, the jitter time, and the backoff time used prior to transmission of the message comprising at least one packet, accumulated over a time window period.

6. The method according to claim 5, wherein the Transmit Overhead Utilization (TOU) is expressed as a ratio of time used for transmission of the message over the time window period, and the Transmit Overhead Utilization (TOU) is determined based on:

$$TOU(t)=(T(t-w,t)+J(t-w,t)+B(t-w,t))/w$$

where:
t is the current time,
w is the number of seconds in the past that is being considered, the window period,
$T=T(t_1, t_2)$ is the total amount of time spent transmitting between times $t_1$ and $t_2$,
$J=J(t_1, t_2)$ is the total amount of time spent in jitter between times $t_1$ and $t_2$, and
$B=B(t_1, t_2)$ is the total amount of time spent in backoff between times $t_1$ and $t_2$.

7. The method according to claim 4, wherein the Medium Access Control (MAC) layer measures a Received/Transmit Utilization (RTU) comprising a time used for reception of a message comprising at least one packet, expressed as a ratio of the time used for reception of a message comprising at least one packet over a window period.

8. The method according to claim 7, wherein Received/Transmit Utilization (RTU) is determined based on:

$$RTU(t)=(T(t-w,t)+R(t-w,t))/w$$

where:
t is the current time,
w is the window period,
$T(t_1, t_2)$ is the total amount of time spent transmitting between times $t_1$ and $t_2$, and
$R=R(t_1, t_2)$ is the total amount of time spent in active receive between times $t_1$ and $t_2$.

9. The method according to claim 2, wherein the Transmit Overhead Utilization (TOU) and the Receive/Transmit Utilization (RTU) are a function on T, R, J, B, for f and g:

$$TOU(t)=f(T(t,t-w)+J(t,t-w)+B(t,t-w),w);$$

$$RTU(t)=g(T(t,t-w)+J(t,t-w)+B(t,t-w),w)$$

where:
t is a current time,
w is the number of seconds in the past that is being considered, a window period,
$T=T(t_1, t_2)$ is the total amount of time spent transmitting between times $t_1$ and $t_2$,
$J=J(t_1, t_2)$ is the total amount of time spent in jitter between times $t_1$ and $t_2$,
$B=B(t_1, t_2)$ is the total amount of time spent in backoff between times $t_1$ and $t_2$, and
$R=R(t_1, t_2)$ is the total amount of time spent in active receive between times $t_1$ and $t_2$.

10. The method according to claim 2, wherein each of the Transmit Overhead Utilization (TOU) and the Receive/Transmit Utilization (RTU) has a congestion-determination threshold.

11. The method according to claim 10, wherein the Transmit Overhead Utilization (TOU) threshold and the Receive/Transmit Utilization (RTU) threshold are each history-dependent.

12. The method according to claim 10, wherein the Transmit Overhead Utilization (TOU) threshold and Receive/Transmit Utilization (RTU) threshold are each applied with hysteresis.

13. The method according to claim 12, wherein the Medium Access Control (MAC) layer determines the self-congestion parameter of the respective communication device depending on a self-overload status, which indicates a self-overload if and only if the Transmit Utilization Overhead (TOU) is above a hysteresis-dependent threshold or the Receive/Transmit Utilization (RTU) is above a hysteresis-dependent threshold.

14. The method according to claim 12, wherein the Medium Access Control (MAC) layer indicates no self-overload if and only if the Transmit Utilization Overhead (TOU) is below a hysteresis-dependent threshold and the Receive/Transmit Utilization (RTU) is below a hysteresis-dependent threshold.

15. The method according to claim 14, wherein a self-overload status remains at a prior state unless either of the Transmit Utilization Overhead (TOU) and Receive/Transmit Utilization (RTU) are above the hysteresis-dependent threshold or both Transmit Utilization Overhead (TOU) and Receive/Transmit Utilization (RTU) are below the hysteresis-dependent threshold.

16. The method according to claim 2, wherein the Medium Access Control (MAC) layer determines the self-congestion parameter as a self-overload status of the respective communication device dependent on the Transmit Overhead Utilization (TOU) parameter and the Received/Transmit Utilization (RTU) parameter, and the self-overload status is forwarded by the Medium Access Control (MAC) layer to the Transport Layer (TL).

17. The method according to claim 12, wherein the Medium Access Control (MAC) layer receives the neighbor congestion parameter of the neighbor communication device as a respective self-overload status of the neighbor communication device dependent on a respective Transmit Overhead Utilization (TOU) parameter and a Received/Transmit Utilization (RTU) parameter of the neighbor communication device.

18. The method according to claim 17, further comprising maintaining a neighbor-overload status dependent on whether any neighbor communication device indicates a self-overload status, wherein the neighbor-overload status is cleared if no self-overload status is received from any neighbor communication device within a timeout period.

19. The method according to claim 18, further comprising maintaining a net-overload status comprising self-overload status OR neighbor-overload status, further comprising:
communicating an alert from the Medium Access Control (MAC) layer of the respective communication device to the Transport Layer (TL) of the respective communication device when the net-overload status changes;
setting a TL-overload status to overload if net-overload status is overload and a rate the Transport Layer (TL) is sending packets is in excess of a threshold rate; and
limiting a rate at which the Transport Layer (TL) sends packets to the threshold rate if the TL-overload status is overload.

20. The method according to claim 19, further comprising:
propagating the TL-overload status, at a Network Layer (NL) of the respective communication device to the multi-hop wireless network, to an application associated with generating the excessive traffic of packets; and
throttling traffic from the application dependent on the TL-overload status.

21. A non-transitory computer readable medium for controlling a programmable automated device to manage congestion in a node of a multi-hop wireless network comprising a plurality of communication devices communicating packets through a communication medium, comprising:
executable instructions for determining a self-congestion parameter at a Medium Access Control (MAC) layer of a respective communication device representing congestion in the multi-hop wireless network;
executable instructions for receiving a neighbor congestion parameter from a neighbor communication device of the multi-hop wireless network;
executable instructions for propagating information comprising the determined self-congestion parameter of the respective communication device and neighbor congestion parameter from the neighbor communication device through the Medium Access Control (MAC) layer of the respective communication device to the communication medium of the multi-hop wireless network;
executable instructions for determining, dependent on the propagated information comprising the neighbor congestion parameter, at a Transport Layer (TL) of the respective communication device, that the respective communication device in the multi-hop wireless network is generating excessive traffic of packets in the communication medium of the multi-hop wireless network, according to at least one criterion; and
executable instructions for modulating a flow of packets in the communication medium of the multi-hop wireless network from the respective communication device, dependent on the determining of the excessive traffic of packets,
to thereby regulate traffic in the multi-hop wireless network.

22. A node of a multi-hop wireless network, the multi-hop wireless network comprising a plurality of communication devices communicating packets through a communication medium, the node comprising:
a transceiver configured to communicate through the communication medium, under control of a Medium Access Control (MAC) layer and a Transport Layer (TL); and
an automated controller which controls the Medium Access Control (MAC) layer, and the Transport Layer (TL), the automated controller being configured to:
determine a self-congestion parameter at the Medium Access Control (MAC) layer of the node representing congestion in the multi-hop wireless network;
receive a neighbor congestion parameter from a neighbor communication device of the multi-hop wireless network through the transceiver;
propagate information comprising the determined self-congestion parameter of the node and neighbor congestion parameter from the neighbor communication device through the Medium Access Control (MAC) layer through the transceiver to the communication medium of the multi-hop wireless network;
determine, dependent on the propagated information comprising the neighbor congestion parameter, at the Transport Layer (TL) of the node, that the node is generating excessive traffic of packets in the communication medium of the multi-hop wireless network, according to at least one criterion; and
modulate a flow of packets in the communication medium of the multi-hop wireless network from the node, dependent on the determining of the excessive traffic of packets,
to thereby regulate traffic in the multi-hop wireless network.

* * * * *